United States Patent [19]
Tajiri et al.

[11] Patent Number: 6,023,448
[45] Date of Patent: Feb. 8, 2000

[54] OPTICAL PICKUP DEVICE AND OPTICAL RECORDING MEDIUM DRIVING APPARATUS COMPRISING THE SAME

[75] Inventors: Atsushi Tajiri, Osaka-fu; Takenori Goto, Moriguchi; Yasuaki Inoue, Nagaokakyo; Kazushi Mori, Hirakata; Minoru Sawada, Yawata; Akira Ibaraki, Hirakata, all of Japan

[73] Assignee: Sanyo Electric Co., Ltd., Moriguchi, Japan

[21] Appl. No.: 08/997,742

[22] Filed: Dec. 24, 1997

[30] Foreign Application Priority Data

Dec. 26, 1996 [JP] Japan ..................................... 8-348679
Feb. 21, 1997 [JP] Japan ..................................... 9-038225

[51] Int. Cl.$^7$ ....................................................... G11B 7/00
[52] U.S. Cl. ........................................ 369/112; 369/44.14
[58] Field of Search ..................................... 369/112, 110, 369/109, 111, 120, 122, 121, 44.14, 44.23, 44.24, 44.37, 44.12, 77.2

[56] References Cited

U.S. PATENT DOCUMENTS

| | | | |
|---|---|---|---|
| 4,907,847 | 3/1990 | Onayama et al. | 350/3.73 |
| 5,285,062 | 2/1994 | Lee | 250/216 |
| 5,870,370 | 2/1999 | Takahashi et al. | 369/120 X |

FOREIGN PATENT DOCUMENTS

| | | |
|---|---|---|
| 62-36752 | 2/1987 | Japan. |
| 3-278330 | 12/1991 | Japan. |
| 7-121901 | 5/1995 | Japan. |

*Primary Examiner*—Muhammad Edun
*Attorney, Agent, or Firm*—Armstrong, Westerman Hattori, McLeland And Naughton

[57] ABSTRACT

An optical pickup device has a case constructed by joining a lower frame member and an upper frame member. A semiconductor laser device, a three-beam generating diffraction grating, a transmission type holographic optical element, and a reflecting mirror are arranged in the lower frame member. A lead frame is arranged in the lower frame member. The semiconductor laser device is arranged on the lead frame through a heat sink, to emit laser light in a horizontal direction. A photodiode and the lead frame are arranged in the upper frame member. The photodiode has a light receiving surface parallel to the direction of light emission from the semiconductor laser device, and is mounted on the lead frame. The laser light emitted from the semiconductor laser device passes through the three-beam generating diffraction grating and the transmission type holographic optical element, and is then bent upward and introduced into an optical recording medium. Returned light reflected from a recording surface of the optical recording medium is changed in a direction parallel to the direction of light emission from the semiconductor laser device, passes through the transmission type holographic optical element and the three-beam generating diffraction grating again, is then changed vertically upward by the reflecting mirror, and is incident on the photodiode.

44 Claims, 31 Drawing Sheets

F I G. 20
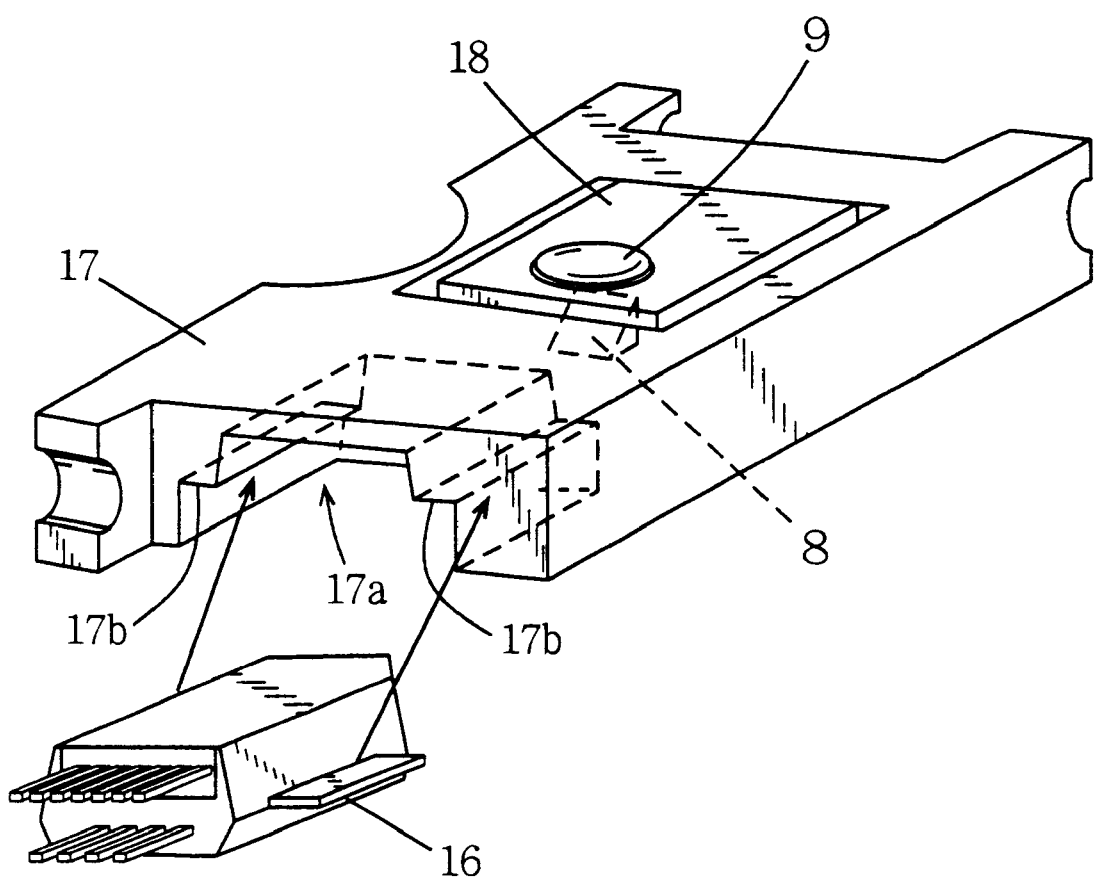

OPTICAL PICKUP DEVICE AND OPTICAL RECORDING MEDIUM DRIVING APPARATUS COMPRISING THE SAME

BACKGROUND OF THE INVENTION

1. Field of the Invention

The present invention relates to an optical pickup device using a diffraction element such as a holographic optical element and an optical recording medium driving apparatus comprising the same.

2. Description of the Background Art

In recent years, an optical pickup device using a holographic optical element has been studied and developed with demands for the miniaturization and the light weight as well as the low cost of the optical pickup device. This type of optical pickup device is disclosed in Japanese Patent Laid-Open No. 124205/1996, for example. FIG. 35 is a side view showing the schematic construction of a conventional optical pickup device, and FIG. 36 is a plan view showing the schematic construction of the conventional optical pickup device.

In FIGS. 35 and 36, in the conventional optical pickup device, an electrically conducting heat sink 3, a semiconductor laser device 5, a transmission type three-beam generating diffraction grating 6, a transmission type holographic optical element 7, and a reflecting mirror 8 are arranged on a main surface of a substrate 2.

The substrate 2 is made of an electrically conducting semiconductor material such as n-type Si (silicon), a good thermal conductive material composed of an electrically conducting metal such as copper, resin, or the like.

The semiconductor laser device 5 formed on an n-type Si semiconductor substrate is put on the electrically conducting heat sink 3. A pin photodiode 4a is formed on a main surface of the electrically conducting heat sink 3, and a photodiode 4b for information signal detection is formed beside the photodiode 4a. Further, the semiconductor laser device 5 is mounted on the main surface of the electrically conducting heat sink 3. The transmission type three-beam generating diffraction grating 6 is fixed to a groove 2a of the substrate 2 so as to be positioned ahead of a light emitting portion of the semiconductor laser device 5. The transmission type three-beam generating diffraction grating 6 has a diffraction grating surface 6a composed of concavities and convexities at an equal pitch on its surface on the side of the semiconductor laser device 5, and divides laser light emitted from the semiconductor laser device 5 into zero-order, +1st-order and −1st-order diffracted light beams and emits the light beams.

The transmission type holographic optical element 7 is fixed to a groove 2b of the substrate 2 so as to be opposite to the transmission type three-beam generating diffraction grating 6 on the light emission side of the transmission type three-beam generating diffraction grating 6. The transmission type holographic optical element 7 comprises a transparent substrate having a holographic functional surface 7a composed of a group of curves whose concavities and convexities are at a gradually changed period formed on its surface on the side of the transmission type three-beam generating diffraction grating 6.

The reflecting mirror 8 is fixed to a groove 2c of the substrate 2 so as to be inclined through an angle of 45° with the transmission type holographic optical element 7 on the light emission side of the transmission type holographic optical element 7. The reflecting mirror 8 reflects the three diffracted light beams passing through the transmission type holographic optical element 7 upward at approximately right angles.

An objective lens 9 is arranged above the reflecting mirror 8, and focuses the diffracted light beams reflected by the reflecting mirror 8 on a recording surface of a reflection type optical recording medium 1, to form a main spot caused by the zero-order diffracted light beam and two sub-spots caused by the ±1st-order diffracted light beams on both sides of the main spot.

Furthermore, a reflecting mirror 10 focuses into the photodiode 4b the three returned light beams from the optical recording medium 1 which include information signals in the main beam and the two sub-beams according to the main spot and the two sub-spots respectively.

In the above-mentioned optical pickup device, the laser light emitted from a rear facet of the semiconductor laser device 5 is received by the photodiode 4a. The photodiode 4a outputs a signal corresponding to the amount of received output power of the laser light. An automatic power control circuit (not shown) controls the semiconductor laser device 5 such that light output power of the laser light from the semiconductor laser device 5 is constant on the basis of the signal from the photodiode 4a.

On the other hand, the laser light emitted from a front facet of the semiconductor laser device 5 is divided into three zero-order and ±1st-order diffracted light beams by the transmission type three-beam generating diffraction grating 6, after which the three diffracted light beams are incident on the transmission type holographic optical element 7. The three diffracted light beams passing through the transmission type holographic optical element 7 are reflected upward by the reflecting mirror 8, and are then focused as a main spot and two sub-spots by the optical recording medium 1 using the light-focusing function of the objective lens 9. The three diffracted light beams focused as the main spot and the two sub-spots on the optical recording medium 1 are reflected as three returned light beams including the information recorded on the optical recording medium 1 on the surface of the optical recording medium 1. The three returned light beams pass through the objective lens 9, is reflected by the reflecting mirror 8, and is then incident on the transmission type holographic optical element 7.

The three returned light beams passing through the transmission type holographic optical element 7 by 1st-order (or −1st-order) diffraction pass above the diffraction grating surface 6a of the transmission type three-beam generating diffraction grating 6, are then reflected downward by the reflecting mirror 10, and are incident on the photodiode 4b.

A reproducing signal, a focus error signal produced by a well-known astigmatism method, and a tracking error signal caused by a well-known three-beam method are obtained on the basis of the returned light beams incident on the photodiode 4b. Consequently, playback of the information recorded on the optical recording medium 1, tracking servo and focusing servo are performed.

In the optical pickup device, the photodiode 4b for returned light detection and the semiconductor laser device 5 are provided on the common main surface of the electrically conducting heat sink 3. Therefore, a lead frame member electrically connected to the photodiode 4b and a lead frame member electrically connected to the semiconductor laser device 5 are flush with each other. Therefore, the width of a case of the optical pickup device is increased, so that the optical pickup device is increased in size.

In the above-mentioned optical pickup device, the reflecting mirror 10 is movably and rotatably mounted in order that the returned light beams reflected by the optical recording medium 1 are incident on the photodiode 4b in their most suitable states. Therefore, a mounting mechanism of the reflecting mirror 10 is complicated and is increased in size, so that the thickness of the case of the optical pickup device is increased.

Furthermore, the fabricating steps of the optical pickup device comprise the output inspecting step of the semiconductor laser device 5. FIG. 37 is an explanatory view of the step of inspecting the semiconductor laser device in the conventional optical pickup device shown in FIGS. 35 and 36. The inspecting step is carried out in a state where the electrically conducting heat sink 3 and the semiconductor laser device 5 are arranged on the main surface of the substrate 2, laser light B is emitted from the semiconductor laser device 5, and the light intensity distribution of the laser light B is detected ahead of the semiconductor laser device 5. The light intensity distribution of the laser light B is referred to as a far-field pattern FFP. The divergence angle and the shift in position of the optical axis of the laser light B from the semiconductor laser device 5 are detected by measuring the half-width W and the peak position P of the light intensity on the basis of the far-field pattern FFP.

In the above-mentioned optical pickup device, however, the laser light from the semiconductor laser device 5 is emitted approximately parallel to the main surface of the substrate 2, and is radially enlarged as it travels. Therefore, a part of the laser light B enlarged toward the main surface of the substrate 2 is prevented from directly traveling upon striking the main surface of the substrate 2, so that a missing portion L occurs in the far-field pattern FFP. Therefore, an accurate far-field pattern FFP is not obtained, so that errors occur in the spreading inspection and the inspection of the shift in position of the laser light from the semiconductor laser device 5.

SUMMARY OF THE INVENTION

An object of the present invention is to provide a small-sized optical pickup device in which lead frame members are prevented from being flush with each other and an optical recording medium driving apparatus comprising the same.

Another object of the present invention is to provide an optical pickup device in which an adjusting mechanism for making such adjustment that a light beam reflected by an optical recording medium is incident on the most suitable position of a photodetector and an optical recording medium driving apparatus comprising the same.

Still another object of the present invention is to provide an optical pickup device in which laser light emitted from a semiconductor laser device is prevented from traveling by another member and an optical recording medium driving apparatus comprising the same.

An optical pickup device according to the present invention comprises a first supporting member, a second supporting member arranged on the first supporting member, a first lead frame member provided in the first supporting member, a second lead frame member provided in the second supporting member, a light source provided in the first supporting member and electrically connected to the first lead frame member for emitting light, and a photodetector provided in the second supporting member and electrically connected to the second lead frame member for detecting returned light based on the light emitted from the light source.

In the optical pickup device according to the present invention, the first lead frame member electrically connected to the light source is provided in the first supporting member, and the second lead frame member electrically connected to the photodetector is provided in the second supporting member. The second supporting member is arranged on the first supporting member. Therefore, the first supporting member and the second supporting member are arranged apart from each other in the direction in which the first supporting member and the second supporting member are laminated. Consequently, the width of a case of the optical pickup device comprising the first supporting member and the second supporting member is decreased, so that it is possible to miniaturize the optical pickup device.

Particularly, the first supporting member has a first surface, the second supporting member has a second surface opposite to the first surface so as to be approximately parallel thereto, the light source is so arranged as to emit the light in a direction parallel to the first surface, and the photodetector is so arranged as to receive the returned light incident thereon in a direction parallel to the second surface.

In this case, the light emitted from the light source is emitted in the direction parallel to the first surface of the first supporting member, and the returned light reflected by the optical recording medium is incident in the direction parallel to the second surface of the second supporting member. The incident returned light is incident on the photodetector provided in the second supporting member. The light emitted from the light source and the returned light travel in a direction parallel to the first and second surfaces which are parallel to each other. Consequently, it is possible to decrease the thickness of the optical pickup device in a direction perpendicular to the direction of travel of the light.

Particularly, the first supporting member and the second supporting member respectively have joint surfaces parallel to the first surface, and the first supporting member and the second supporting member are joined to each other so as to be relatively movable along the joint surfaces at the time of assembling.

In this case, it is possible to make such adjustment that the position where the returned light is incident on the photodetector is the most suitable by relatively moving the first supporting member and the second supporting member along the joint surfaces.

Particularly, the first lead frame member is so arranged as to be parallel to the first surface, and the second lead frame member is so arranged as to be parallel to the second surface.

Furthermore, optical pickup device may have a reflecting member on said first supporting member for reflecting and guiding the returned light to the photo detecter.

The first lead frame member has a projection projecting from the first supporting member, and the second lead frame member has a projection projecting from the second supporting member.

Furthermore, it is preferable that the projection of the first lead frame member and the projection of the second lead frame member project in the same direction.

In this case, the first and second lead frame members project from respective one end surfaces of the first and second supporting members of the optical pickup device, so that it is easy to arrange an external connecting terminal connected to the first and second lead frame members.

Particularly, it is preferable that the light source emits light from respective one ends of the first and second supporting members, and the respective projections of the first and second lead frame members project from the other ends of the first and second supporting members.

Such a shape makes it possible to obtain an optical pickup device whose width in a direction perpendicular to the direction of light emission is decreased.

Particularly, it is preferable that the first lead frame member further has a heat radiating portion projecting from a side surface of the first supporting member.

In this case, heat from a heat generating member arranged in the first supporting member, for example, the light source can be discharged outward through the heat radiating portion of the first lead frame member, so that the operating characteristics of the optical pickup device are prevented from varying due to the change in temperature. It is also possible that the heat radiating portion functions as an attaching portion to a housing of the optical pickup device.

Particularly, the light source may be mounted on the first lead frame member, and the photodetector may be mounted on the second lead frame member.

In this case, the light source is arranged in the first supporting member through the first lead frame member, and the photodetector is arranged in the second supporting member through the second lead frame member. Therefore, it becomes easy to make an electrical connection between the light source and the first lead frame member and an electrical connection between the photodetector and the second lead frame member.

Particularly, it is preferable that the optical pickup device comprises a heat sink arranged on the first lead frame member. In this case, heat generated at the time of operating the light source, for example, the semiconductor laser device is absorbed by a heat sink, so that it is possible to prevent the light output power characteristics of the semiconductor laser device from varying by heat generation.

It is preferable that the light source is a semiconductor laser device arranged on the heat sink. In this case, the semiconductor laser device is arranged on the first lead frame member through the heat sink.

Particularly, the photodetector has a light receiving surface receiving the returned light, and the light receiving surface is so arranged as to be parallel to the direction of light emission from the light source.

In this case, the direction of light emission from the light source and the light receiving surface of the photodetector are parallel to each other, so that it is possible to obtain an optical pickup device which is thinned in the direction in which the first supporting member and the second supporting member are laminated.

Particularly, it is preferable that the second supporting member has a covering portion for covering the photodetector, and at least the covering portion of the second supporting member is composed of a transparent material.

The covering portion composed of the transparent material can transmit the returned light and guide the returned light into the light receiving surface of the photodetector. Further, the covering portion of the photodetector prevents the vicinity of the photodetector and a connecting portion between an photodetecting portion and the second lead frame member from being damaged at the time of assembling the optical pickup device. Further, moisture is prevented from entering the photodetector, so that the humidity resistance of the photodetector is improved.

Furthermore, the optical pickup device according to the present invention further comprises a first diffraction element arranged on the light emission side of the semiconductor laser device for diffracting returned light based on the laser light emitted from the semiconductor laser device, and an optical system for guiding the returned light diffracted by the first diffraction element into the photodetector.

In this case, it is possible to diffract the returned light in a predetermined direction by the first diffraction element, change an optical path of the returned light by the optical system and guide the returned light into the photodetector.

The optical pickup device may further comprise a third supporting member mounted on the first supporting member, and the first diffraction element may be mounted on the third supporting member.

In this case, it is possible to easily arrange the first diffraction element in a predetermined position by mounting the third supporting member on the first supporting member.

Particularly, it is preferable that the first supporting member has a guide surface for guiding the third supporting member such that the first diffraction element is movable in the direction of light emission from the semiconductor laser device.

In this case, it is possible to adjust the position of the focus of the laser light passing through the first diffraction element upon moving the first diffraction element in the direction of light emission from the semiconductor laser device by moving the third supporting member along the guide surface of the first supporting member.

The first diffraction element may be arranged on the first surface of the first supporting member. In this case, the first diffraction element is directly arranged in the first supporting member, so that the position thereof is adjusted.

Particularly, it is preferable that the first diffraction element is a transmission type holographic optical element.

Furthermore, the optical pickup device according to the present invention further comprises a second diffraction element arranged between the semiconductor laser device and the first diffraction element for dividing the laser light emitted from the semiconductor laser device into a plurality of light beams.

In this case, it is possible to divide the laser light into a plurality of light beams by the second diffraction element, and perform reproducing of information recorded on the optical recording medium and tracking servo on a recording surface of the optical recording medium utilizing each of the light beams obtained by the division.

The optical pickup device further comprises a focusing element for focusing the laser light emitted from the semiconductor laser device on an optical recording medium. In this case, it is possible to focus the laser light on the recording surface of the optical recording medium by the focusing element to perform an operation for reading out the information.

Particularly, the optical pickup device further comprises a reflecting member arranged on the first supporting member for reflecting and guiding the returned light to the light receiving surface of the photodetector. In this case, it is possible to guide the returned light to the light receiving surface by changing the path of the returned light by the reflecting member.

Further more, the photodetector has a light receiving surface for receiving the returned light and is so arranged as to be perpendicular to the direction of light emission from the light source.

In this case, the returned light from the optical recording medium is incident on the light receiving surface of the photodetector arranged so as to be perpendicular to the direction of light emission from the light source in a direction parallel to the second surface of the second supporting member. Consequently, the necessity of changing the direction of the returned light in the direction perpendicular to the direction of light emission from the light source is eliminated. Therefore, an optical system for changing the direction of the returned light in the perpendicular direction is omitted, so that the construction of the optical pickup device is simplified.

Particularly, it is preferable that the light source is mounted on the first lead frame member, and the photodetector is mounted on the second lead frame member. Further, it is preferable that the light source is a semiconductor laser device for emitting the laser light.

Particularly, the second supporting member has a third surface perpendicular to the direction of light emission of the semiconductor laser device, a folded portion folded along the third surface is formed at a leading end of the second lead frame member, and the photodetector is arranged in the folded portion of the second lead frame member.

In this case, the leading end of the second lead frame member is folded along the third surface of the second supporting member perpendicular to the direction of light emission from the semiconductor laser device, and the photodetector is arranged in the folded portion, so that the light receiving surface of the photodetector is so arranged as to be perpendicular to the direction of light emission from the semiconductor laser device. Consequently, the necessity of an optical system for changing the direction of the returned light in the direction perpendicular to the direction of light emission is eliminated, so that it is possible to simplifying the construction of the optical pickup device.

Particularly, it is preferable that the optical pickup device comprises a first diffraction element arranged on the light emission side of the semiconductor laser device for diffracting returned light based on the laser light emitted from the semiconductor laser device and guiding the returned light into the photodetector.

Consequently, it is possible to diffract the returned light by the first diffraction element, and guide the returned light into the photodetector whose light receiving surface is arranged in the direction perpendicular to the direction of light emission from the semiconductor laser device.

Particularly, the optical pickup device may further comprise a third supporting member mounted on the first supporting member, and the first diffraction element may be mounted on the third supporting member.

In this case, the first diffraction element is placed in a predetermined position of the first supporting member by mounting the third supporting member on the first supporting member.

Particularly, it is preferable that the first diffraction element is a transmission type holographic optical element. Further, the optical pickup device may further comprise a second diffraction element arranged between the semiconductor laser device and the first diffraction element for dividing the laser light emitted from the semiconductor laser device into a plurality of light beams.

In this case, it is possible to perform reproducing of information recorded on the optical recording medium and perform tracking servo on a recording surface of the optical recording medium using a plurality of light beams obtained upon being divided by the second diffraction element.

Furthermore, it is preferable that the optical pickup device further comprises a focusing element for focusing the laser light emitted from the semiconductor laser device on the optical recording medium. Consequently, it is possible to accurately focus the laser light on the optical recording medium.

Particularly, it is preferable that the first supporting member has a flat shape parallel to the first surface. Consequently, it is possible to obtain a thin-shaped optical pickup device in which the thicknesses of the first and second supporting members are decreased.

Furthermore, it is preferable that a notch for passing the light emitted from the light source is formed at a leading end of the first supporting member in the direction of light emission.

In this case, a part of the light emitted from the light source is prevented from being missed by striking the leading end of the first supporting member. Consequently, in the step of inspecting the light source in the optical pickup device, it is possible to detect a far-field pattern which is prevented from being missed by laser light to make a highly precise inspection.

Particularly, the optical pickup device may further comprise a first diffraction element for diffracting returned light based on the light emitted from the light source, and the leading end of the first supporting member may have a supporting surface for supporting the first diffraction element.

The semiconductor laser device is inspected before the first diffraction element is arranged. The notch formed on the supporting surface prevents a part of the laser light emitted from the semiconductor laser device from being missed by striking a leading end of the supporting surface. Consequently, it is possible to make a highly precise inspection of the semiconductor laser device in the optical pickup device by detecting a far-field pattern which is prevented from being missed by the laser light.

Furthermore, it is preferable that the light source comprises a semiconductor laser device, the semiconductor laser device emits laser light in the shape of an ellipse in cross section having a major axis in a direction perpendicular to the supporting surface, and the notch is provided on the supporting surface.

Furthermore, the laser light is in a cross-sectional shape which is wide in the direction perpendicular to the supporting surface, so that the notch is provided on the supporting surface to prevent the laser light from traveling.

Furthermore, an optical pickup device according to the present invention comprises a semiconductor laser device for emitting laser light, and a first supporting member having a first supporting surface for supporting the semiconductor laser device. A notch for passing the laser light emitted from the semiconductor laser device is provided at a leading end of the first supporting member extending in the direction of light emission from the semiconductor laser device.

In this case, the notch prevents a part of the laser light emitted from the semiconductor laser device from being missed by striking the leading end of the first supporting member. In the step of inspecting the semiconductor laser device in the optical pickup device, therefore, it is possible to make a highly precise inspection by detecting a far-field pattern which is prevented from being missed by the laser light.

Particularly, the optical pickup device may further comprise a transmission type diffraction element for diffracting returned light based on the laser light emitted from the semiconductor laser device, and the leading end of the first supporting member may have a supporting surface for supporting the transmission type diffraction element.

The semiconductor laser device is inspected before the transmission type diffraction element is arranged. The notch formed on the diffraction element supporting surface prevents a part of the laser light emitted from the semiconductor laser device from being missed by striking a leading end of the diffraction element supporting surface. Consequently, it is possible to make a highly precise inspection of the semiconductor laser device in the optical pickup device by detecting a fat-field pattern which is prevented from being missed by the laser light.

Particularly, it is preferable that the semiconductor laser device emits laser light in the shape of an ellipse in cross section having a major axis in a direction perpendicular to the diffraction element supporting surface, and the notch is provided on the diffraction element supporting surface. In this case, the laser light is in a cross-sectional shape which is wide in a direction perpendicular to the diffraction element supporting surface. Therefore, the notch is provided on the diffraction element supporting surface to prevent the laser light from traveling.

Particularly, it is preferable that the optical pickup device further comprises a second supporting member having a second supporting surface approximately parallel to the first supporting surface of the first supporting member and joined to the first supporting member, a photodetector arranged on the second supporting surface of the second supporting member for receiving the returned light, and an optical system for guiding the returned light passing through the transmission type diffraction element into the photodetector.

Consequently, it is possible to obtain an optical pickup device capable of accurately inspecting the semiconductor laser device in the fabricating steps and thinned.

An optical recording medium driving apparatus according to the present invention comprises an optical pickup device for emitting light to an optical recording medium and receiving returned light from the optical recording medium, a rotating mechanism for rotating the optical recording medium, an optical pickup driving mechanism for moving the optical pickup device along the radius of the optical recording medium, and a processor for processing a signal outputted from the optical pickup device. The optical pickup device comprises a first supporting member, a second supporting member arranged on the first supporting member, a first lead frame member provided in the first supporting member, a second lead frame member provided in the second supporting member, a light source provided in the first supporting member and electrically connected to the first lead frame member for emitting light, and a photodetector provided in the second supporting member and electrically connected to the second lead frame member for detecting returned light based on the light emitted from the light source.

In this case, the first lead frame member and the second lead frame member are so arranged as to be overlapped with each other in the direction in which they are laminated, whereby a small-sized optical pickup device whose width is decreased is obtained. Therefore, it is possible to miniaturize the optical recording medium driving apparatus by using the miniaturized optical pickup device.

Additionally, an optical recording medium driving apparatus according to the present invention comprises an optical pickup device for emitting laser light to an optical recording medium and receiving returned light from the optical recording medium, a rotating mechanism for rotating the optical recording medium, an optical pickup driving mechanism for moving the optical pickup device along the radius of the optical recording medium, and a processor for processing a signal outputted from the optical pickup device. The optical pickup device comprises a semiconductor laser device for emitting laser light, and a first supporting member having a first supporting surface for supporting the semiconductor laser device. A notch for passing the laser light emitted from the semiconductor laser device is provided at a leading end of the first supporting member extending in the direction of light emission from the semiconductor laser device.

Consequently, it is possible to obtain an optical recording medium driving apparatus capable of accurately inspecting the semiconductor laser device in the fabricating steps and miniaturized using the miniaturized optical pickup device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a perspective view showing a state where the optical pickup device shown in FIG. 16 is assembled;

DESCRIPTION OF THE PREFERRED EMBODIMENTS

Figure 1:
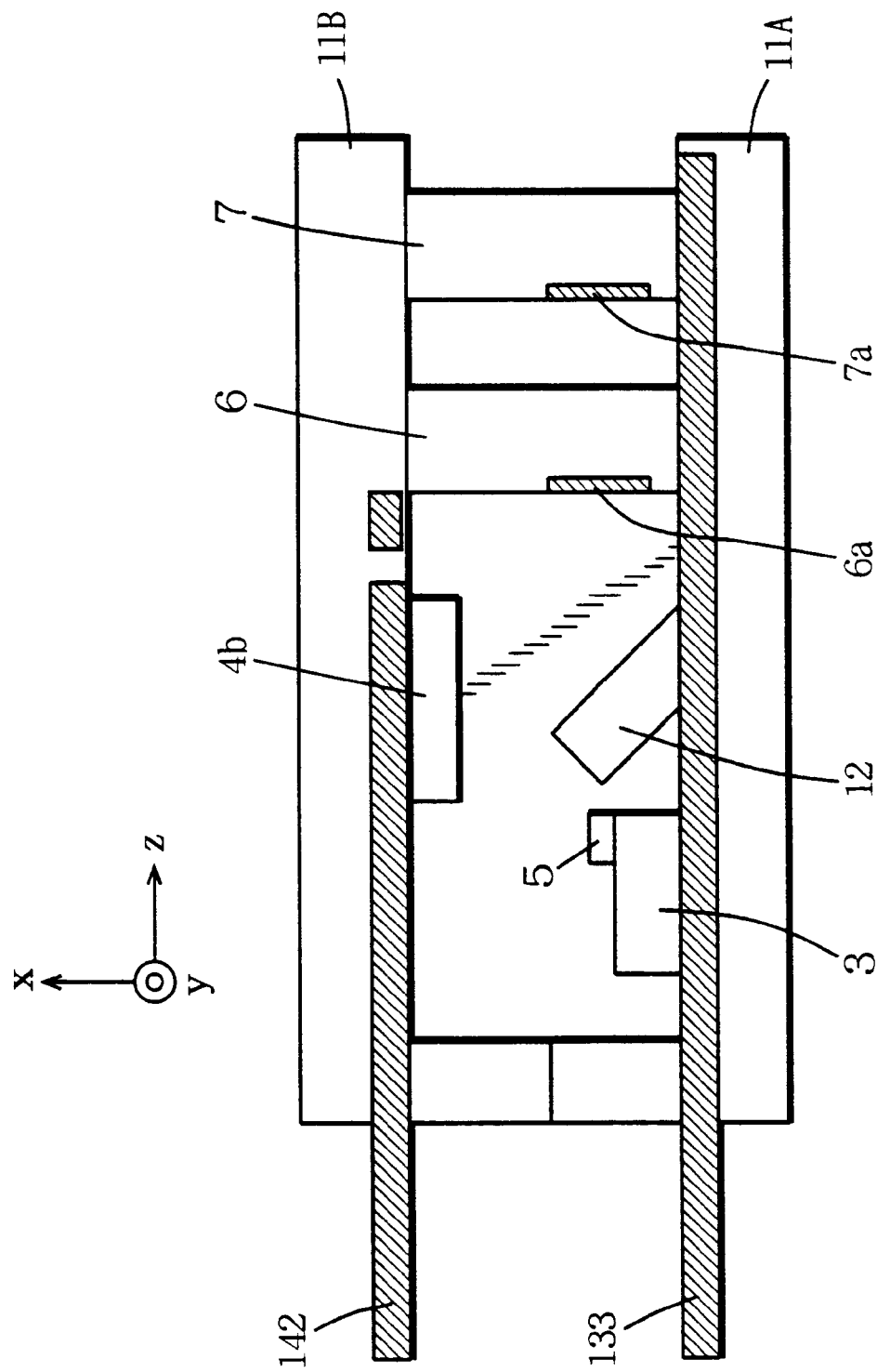
FIG. 1 is a sectional side elevation showing the construction of an optical pickup device according to a first embodiment of the present invention.

Referring now to the drawings, preferred embodiments of the present invention will be described.

(1) First Embodiment

Figure 2:
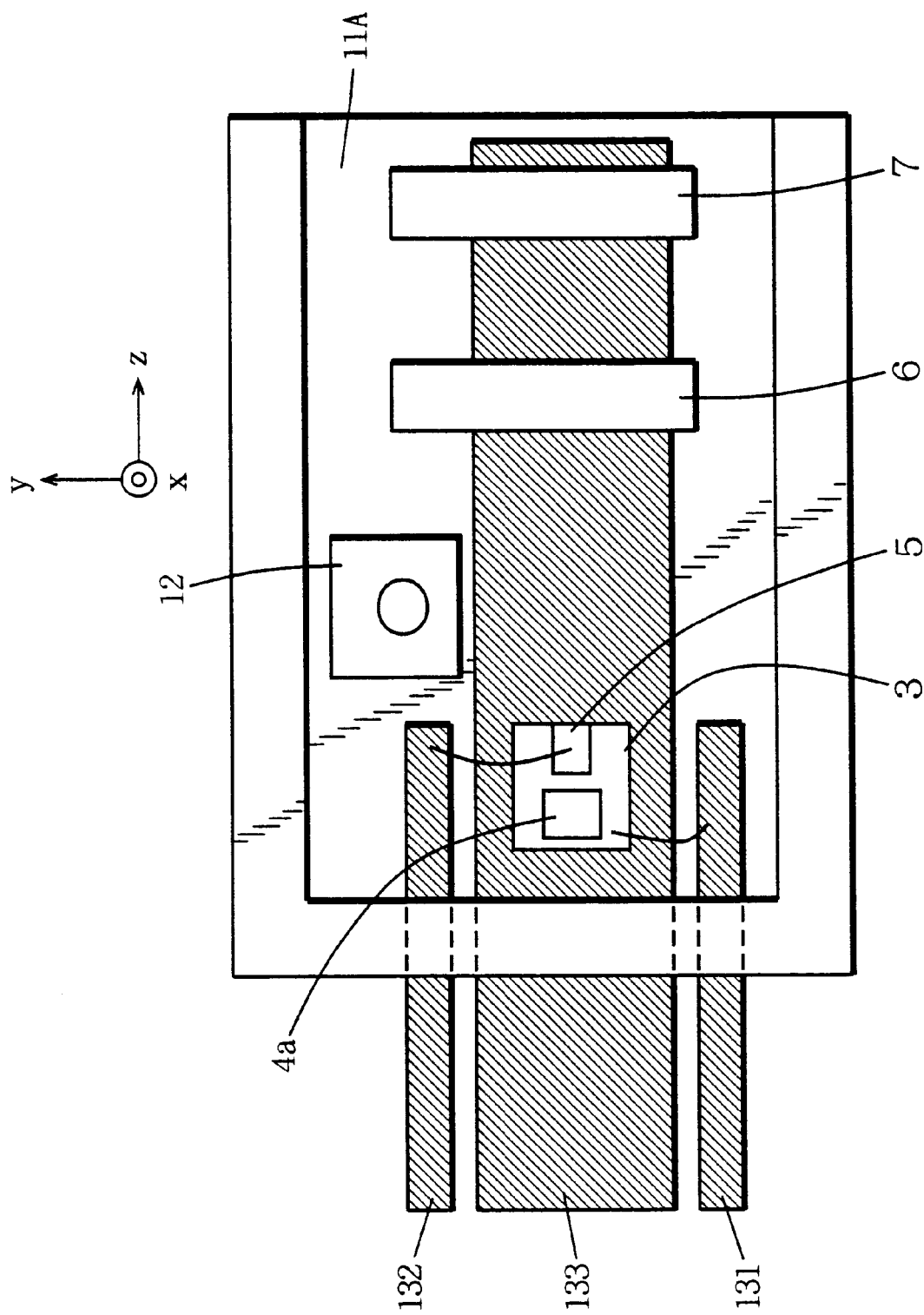
FIG. 2 is a plan view showing the construction of the upper surface of a lower frame member of the optical pickup device shown in FIG. 1.
Figure 3:
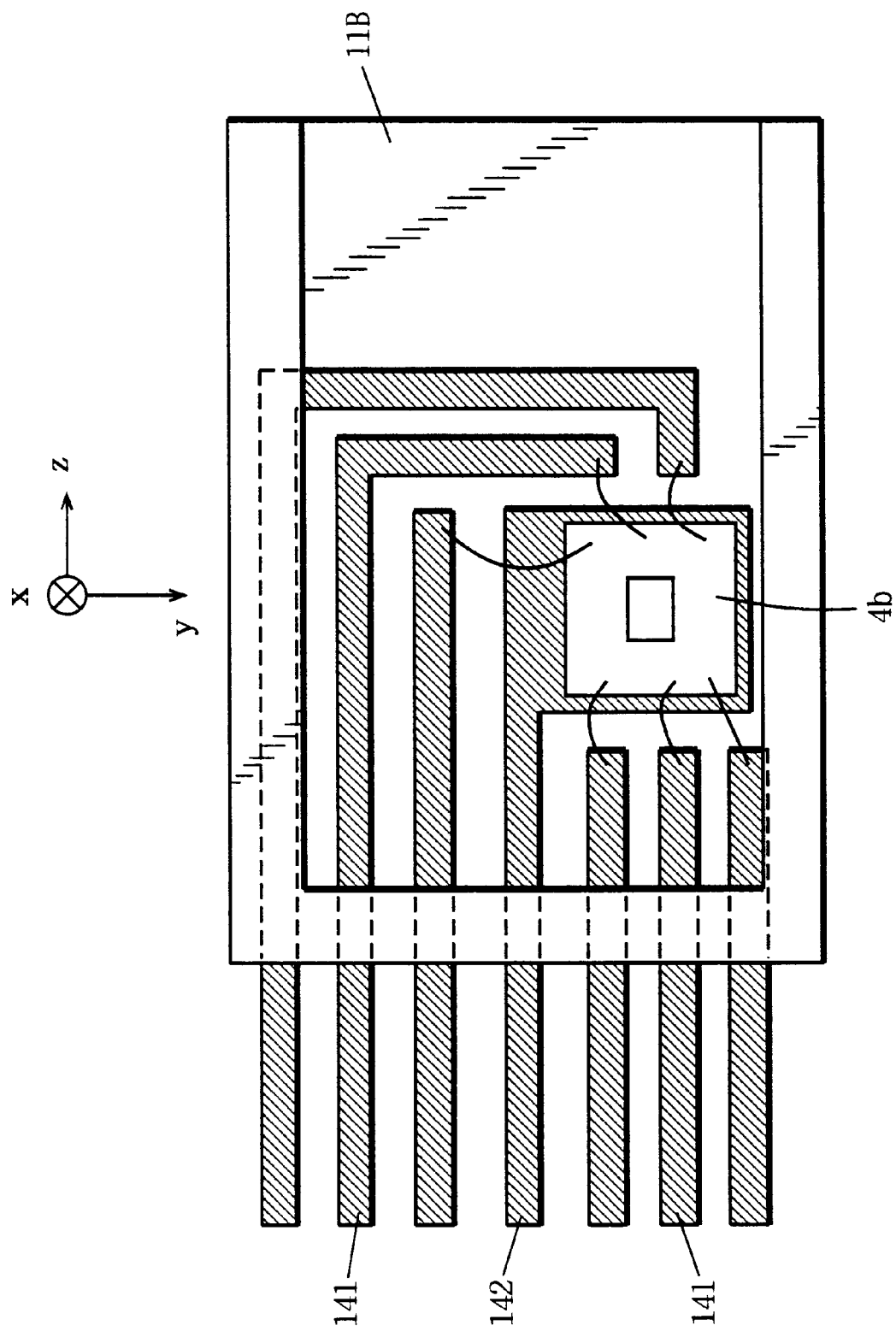
FIG. 3 is a plan view showing the construction of the lower surface of an upper frame member of the optical pickup device shown in FIG. 1.
Figure 4:
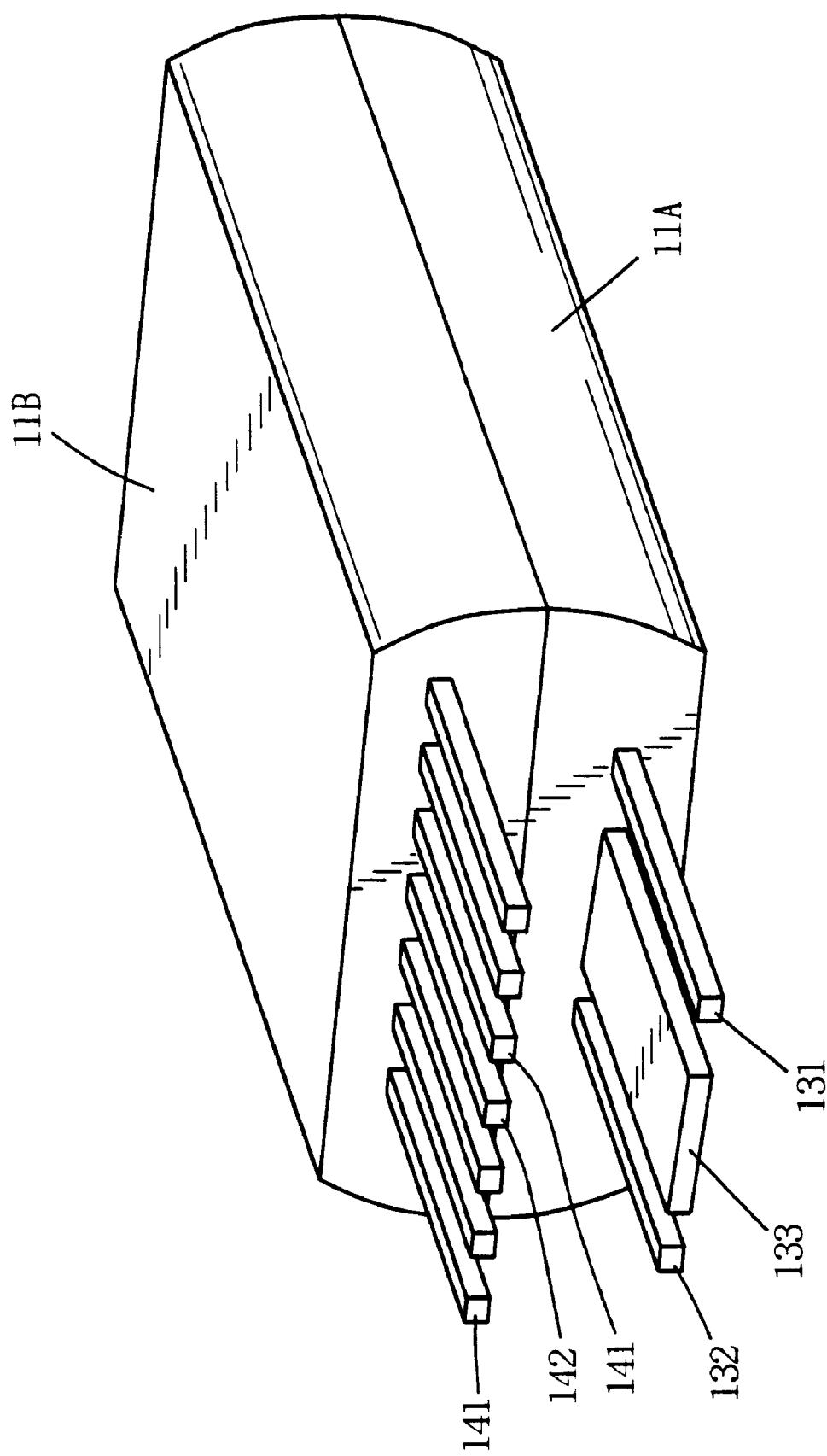
FIG. 4 is a perspective view showing the appearance of the optical pickup device shown in FIG. 1.
Figure 5:
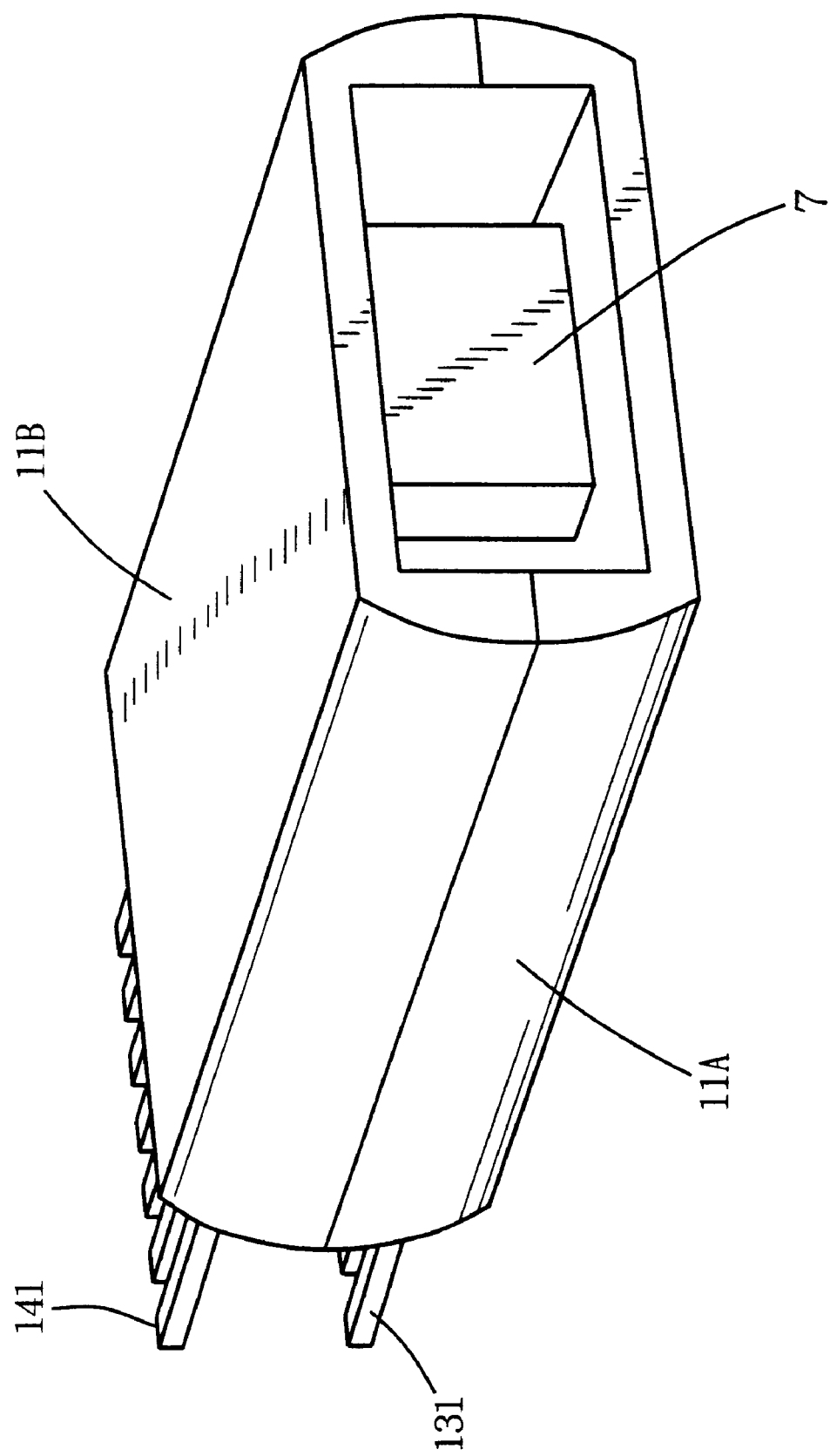
FIG. 5 is a perspective view showing the appearance of the optical pickup device shown in FIG. 1.

An optical pickup device according to a first embodiment is illustrated in FIGS. 1 to 5. In FIGS. 1 to 3, the x-axis, the y-axis, and the z-axis are entered in order that directions in three dimensions will be clear. The x-axis direction is a vertical direction, the z-axis direction is the direction of light emission from a semiconductor laser device, and the y-axis direction is a horizontal direction perpendicular to an x-z plane. The definitions of the x to z axes are the same in all the following embodiments.

In FIGS. 1 to 5, a light emitting and receiving unit of the optical pickup device has a case constructed by fixing a lower frame member 11A and an upper frame member 11B each composed of a resin mold by adhesion. The lower frame member 11A and the upper frame member 11B respectively have main surfaces opposite to each other. An electrically conducting heat sink 3, a transmission type three-beam generating diffraction grating 6, a transmission type holographic optical element 7, and a reflecting mirror 12 is mounted on the main surface of the lower frame member 11A. Further, a photodiode 4a for beam power monitoring is provided in its inner part of the upper surface of the electrically conducting heat sink 3. A photodiode 4b for detecting returned light reflected by the reflecting mirror 12 is mounted on the main surface of the upper frame member 113.

The semiconductor laser device 5 is mounted on a main surface of the electrically conducting heat sink 3. The transmission type three-beam generating diffraction grating 6 has a diffraction grating surface 6a composed of concavities and convexities at an equal period on its surface on the side of the semiconductor laser device 5 ahead of the semiconductor laser device 5, and divides laser light emitted from the semiconductor laser device 5 into zero-order and ±1st-order diffracted light beams and emits the diffracted light beams.

The transmission type holographic optical element 7 is so fixed as to be opposite to the transmission type three-beam generating diffraction grating 6 on the light emission side of the transmission type three-beam generating diffraction grating 6. The transmission type holographic optical element 7 is constituted by a transparent substrate having a holographic functional surface 7a composed of a group of curves whose concavities and convexities are at a gradually changed period on its surface on the side of the transmission type three-beam generating diffraction grating 6.

In the above-mentioned optical pickup device, the direction of emission of the laser light from the semiconductor laser device 5 is a direction (the z-axis direction) which is perpendicular to the direction in which the lower frame member 11B and the upper frame member 11A are opposite to each other. Further, a detecting region of the photodiode 4b (a light receiving surface) is formed in a direction approximately parallel to a y-z plane perpendicular to the direction in which the lower frame member 11A and the upper frame member 11B are opposite to each other.

Figure 6A:
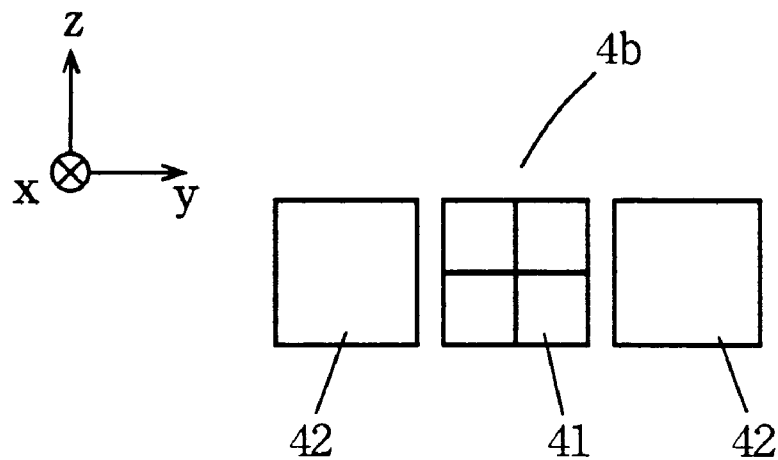
FIGS. 6A and 6B are plan views showing the construction of a photodiode in the optical pickup device shown in FIG. 1.
Figure 6B:
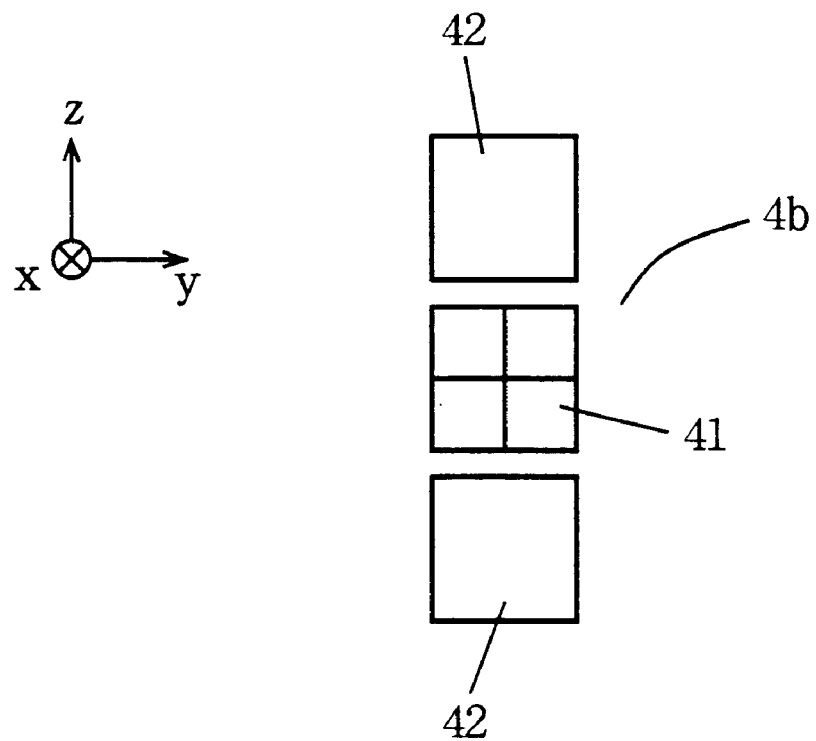

FIGS. 6A and 6B illustrate a detecting region of a photodiode 4b. As shown in FIG. 6A, when the direction of diffraction by the transmission type three-beam generating diffraction grating 6 is the y-axis direction, a detecting region 41 on which a returned light beam based on the zero-order diffracted light beam is incident and split regions 42 on which two returned light beams based on the ±1st-order light beams are respectively incident on both sides of the detecting region 41 are arranged in the y-axis direction. On the other hand, as shown in FIG. 6B, when the direction of diffraction by the transmission type three-beam generating diffraction grating 6 is the x-axis direction, the split regions 42 on which the returned light beams based on the ±1st-order diffracted light beams are respectively incident in the z-axis direction are arranged on both sides of the detecting region 41 on which the returned light beam based on the zero-order diffracted light beam is incident.

The lower frame member 11A is provided with a lead frame 131 for outputting a signal from the photodiode 4a, a lead frame 132 for supplying power to the semiconductor laser device 5, and a lead frame 133 for grounding, for example, which is common to the photodiode 4a and the semiconductor laser device 5. The electrically conducting heat sink 3 is put on the lead frame 133. One end of each of the lead frames 131, 132 and 133 is fixed to the lower frame member 11A, and the other end thereof projects outward from the lower frame member 11A.

The upper frame member 11B is provided with a plurality of lead frames 141 for outputting signals from divided detecting regions of the photodiode 4b and a lead frame 142 for grounding, for example, which is common to the detecting regions of the photodiode 4b. The photodiode 4b is put on the lead frame 142. One end of each of the lead frames 141 and 142 is fixed to the upper frame member 11B, and the other end thereof projects outward from the upper frame member 11B.

The optical pickup device has a housing connected to the above-mentioned light emitting and receiving unit. A reflecting mirror for changing the direction of the optical axis of laser light between the transmission type holographic optical element 7 and an optical recording medium and an objective lens for focusing the laser light on the surface of the optical recording medium are mounted on the housing.

Figure 7:
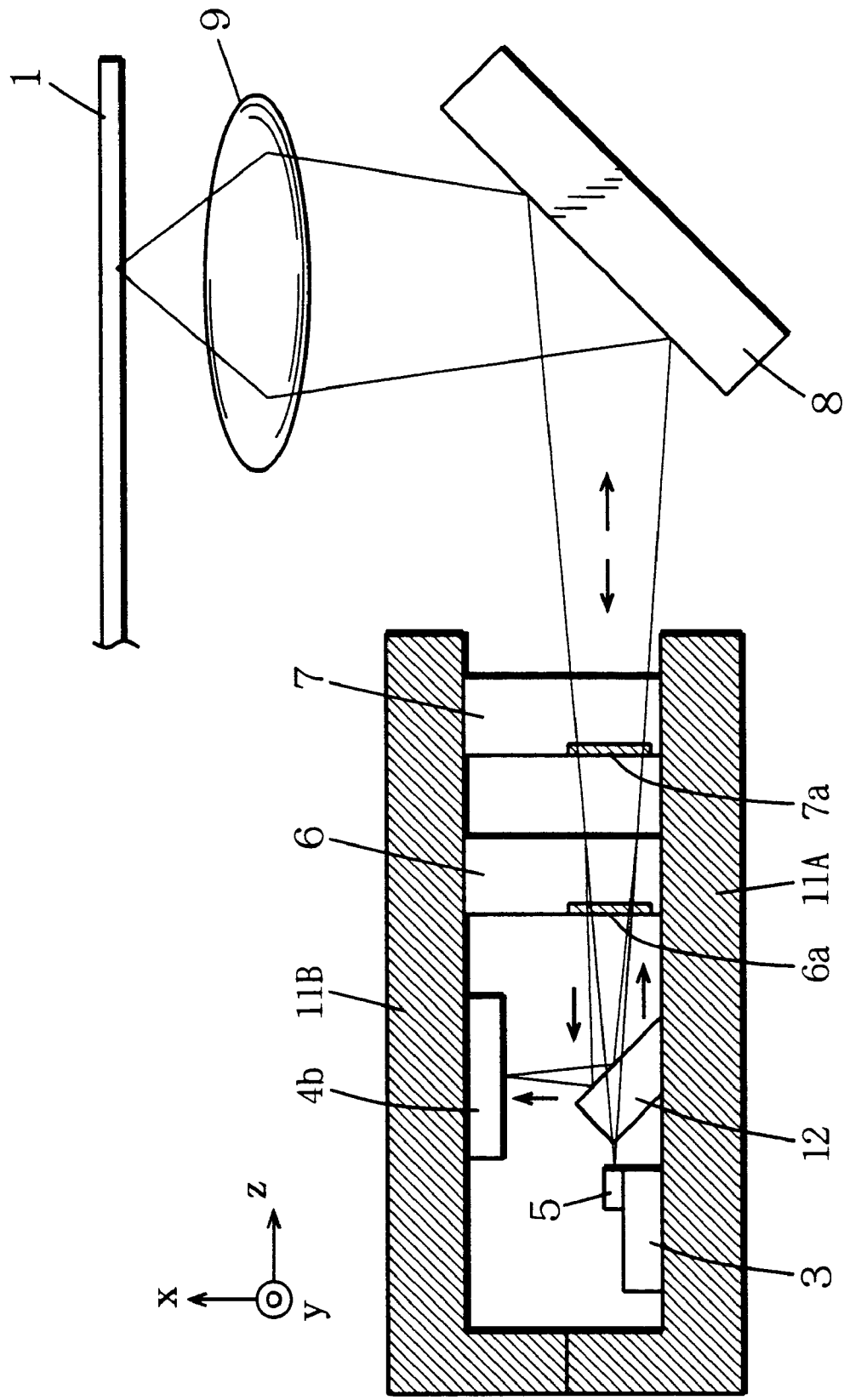
FIG. 7 is a side view showing the travel of laser light in the optical pickup device shown in FIG. 1.
Figure 8:
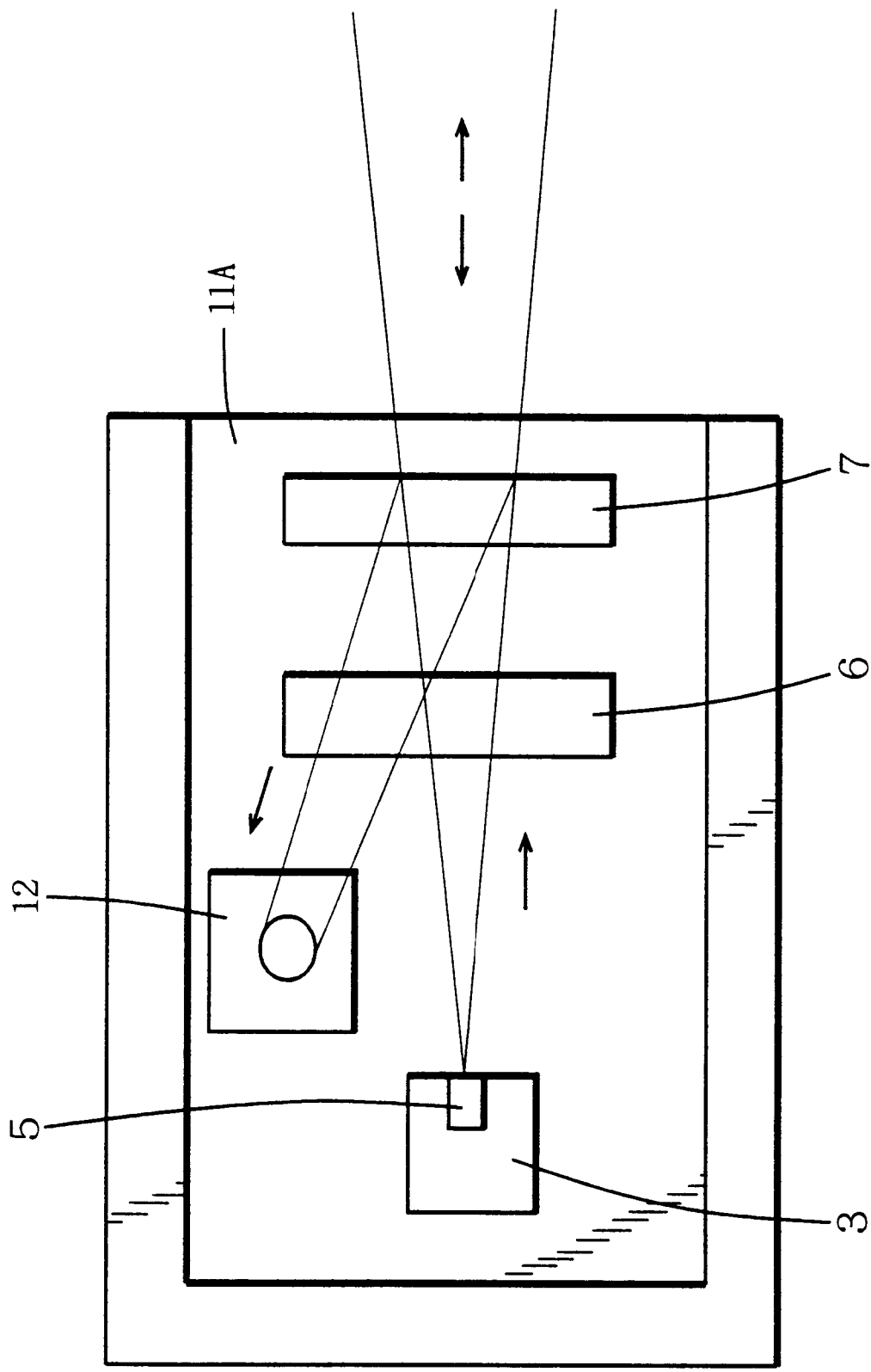
FIG. 8 is a top view showing the travel of laser light in the optical pickup device shown in FIG. 1.

FIG. 7 is a side view showing a state where the laser light travels in the optical pickup device, and FIG. 8 is a plan view showing a state where the laser light travels in the optical pickup device. In the optical pickup device, the laser light outputted from a front facet of the semiconductor laser device 5 is divided into three zero-order and ±1st-order diffracted light beams by the transmission type three-beam generating diffraction grating 6, after which the three diffracted light beams are incident on the transmission type holographic optical element 7. The three diffracted light beams passing through the transmission type holographic optical element 7 are reflected upward by the reflecting mirror 8, and are then focused as a main spot and two sub-spots on the optical recording medium 1 by the light-focusing function of the objective lens 9.

The three diffracted light beams focused as the main spot and the sub-spots on the optical recording medium 1 are reflected as three returned light beams including information recorded on the optical recording medium 1, are reflected by the reflecting mirror 8 after passing through the objective lens 9, and are then incident on the transmission type holographic optical element 7.

The three returned light beams passing through the transmission type holographic optical element 7 by 1st-order (or −1st-order) diffraction pass on the right side or the left side of the diffraction grating surface 6a of the transmission type three-beam generating diffraction grating 6, are then reflected upward by the reflecting mirror 12, and are incident on the photodiode 4b. The returned light beams incident on the photodiode 4b are converted into electric signals, and the electric signals are outputted from the lead frames 141. The information recorded on the optical recording medium is subjected to reproduce, tracking servo and focusing servo on the basis of the outputted electric signals.

In the light emitting and receiving unit of the optical pickup device according to the first embodiment, the lead frames 131, 132 and 133 which are connected to the semiconductor laser device 5 and the photodiode 4a are provided in the lower frame member 11A, and the lead frames 141 and 142 which are connected to the photodiode 4b are provided in the upper frame member 11B. Specifically, the lead frames 131 to 133 and the lead frames 141 and 142 are not flush with each other but provided in different frame portions which differ in height in the x-axis direction. Therefore, the necessity of increasing the widths of the lower frame member 11A and the upper frame member 11B in order to provide the lead frames is eliminated, so that it is possible to decrease the width of a case of the light emitting and light receiving unit of the optical pickup device.

The light emitting and receiving unit of the optical pickup device can be so positioned that the returned light beams are incident on the most suitable positions of the photodiode 4b by being moved along a joint surface between the lower frame member 11A and the upper frame member 11B. After the positioning, the light emitting and receiving unit of the optical pickup device is fabricated upon fixing the lower frame member 11A and the upper frame member 11B by adhesion. Therefore, the necessity of providing a moving mechanism in the reflecting mirror 12 for introducing the returned light beams into the photodiode 4b is eliminated, so that a mounting structure of the reflecting mirror 12 is simplified. Therefore, it is possible to decrease the thickness (the width in the x-axis direction) of the case comprising the lower frame member 11A and the upper frame member 11B.

Figure 9:
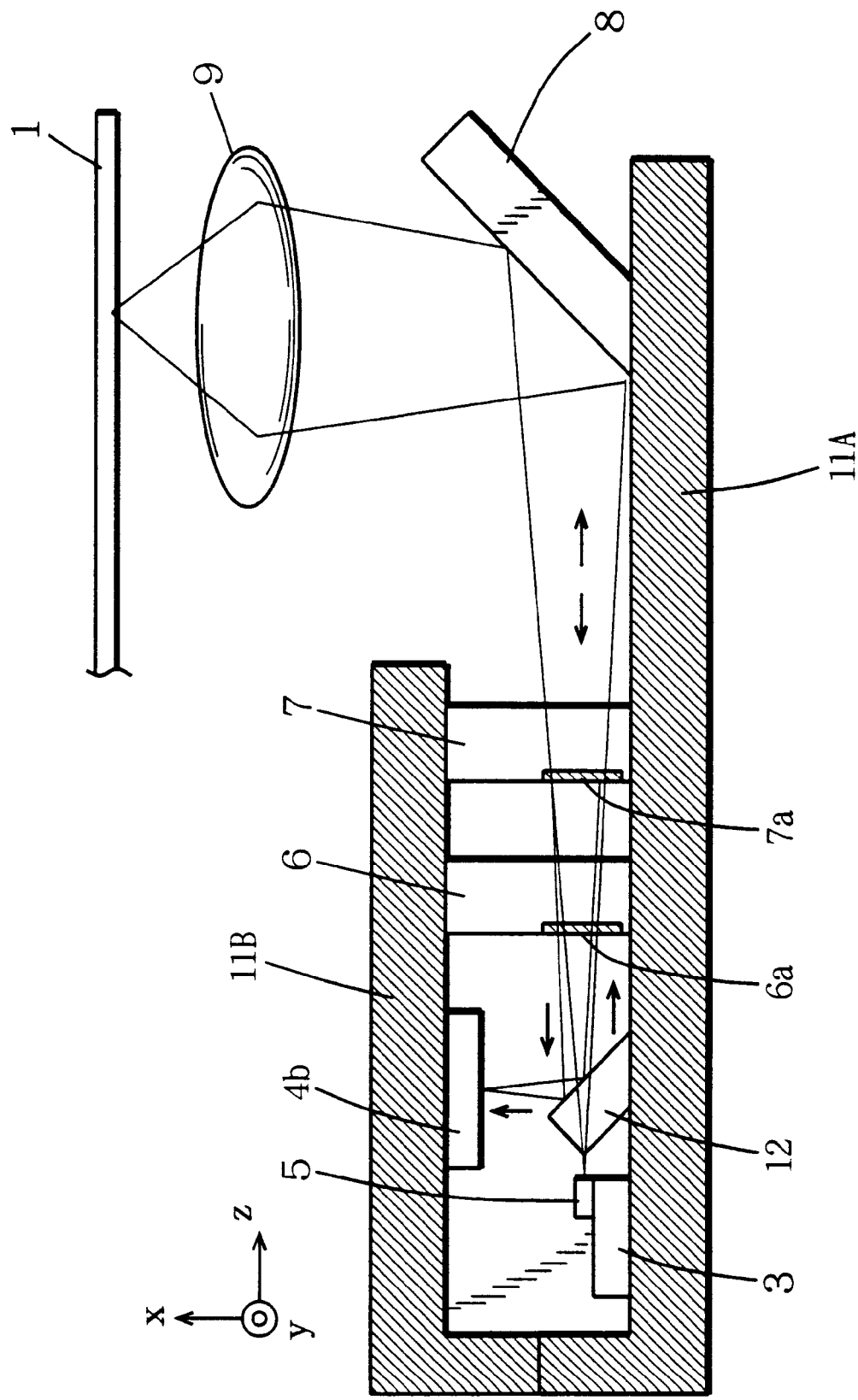
FIG. 9 is a sectional side elevation showing the construction of another example of the optical pickup device shown in FIG. 1.
Figure 10:
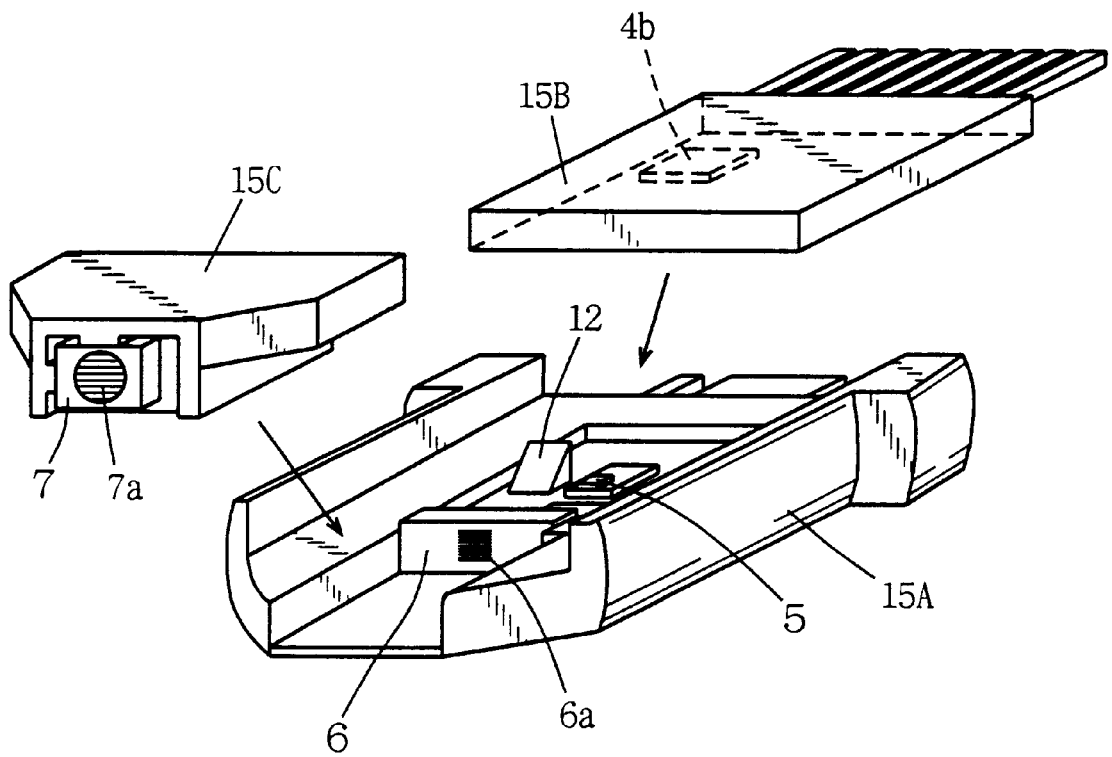
FIG. 10 is an exploded perspective view showing the construction of an optical pickup device according to a second embodiment of the present invention.
Figure 11:
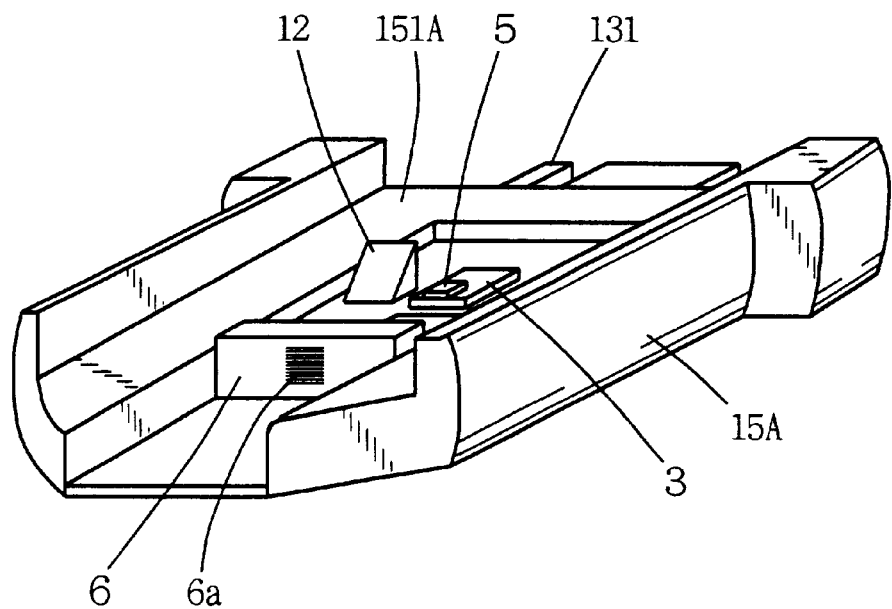
FIG. 11 is a perspective view showing the construction of a lower frame member of the optical pickup device shown in FIG. 10.
Figure 12:
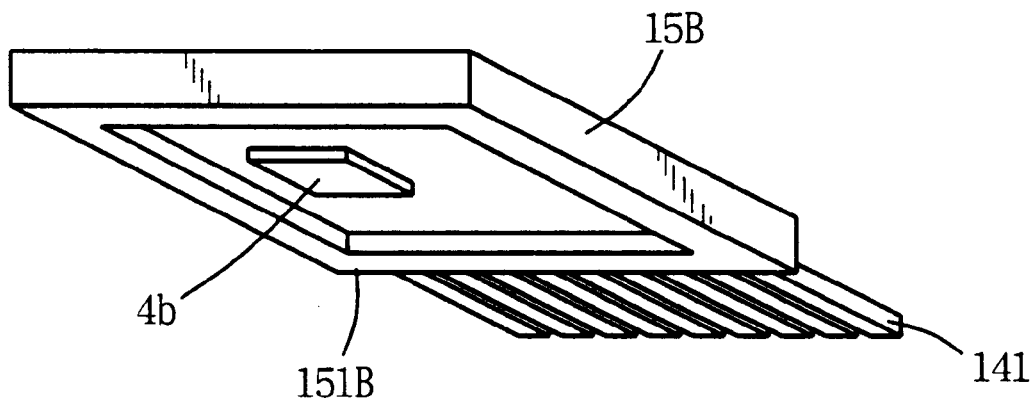
FIG. 12 is a perspective view showing the construction of an upper frame member of the optical pickup device shown in FIG. 10.
Figure 13:
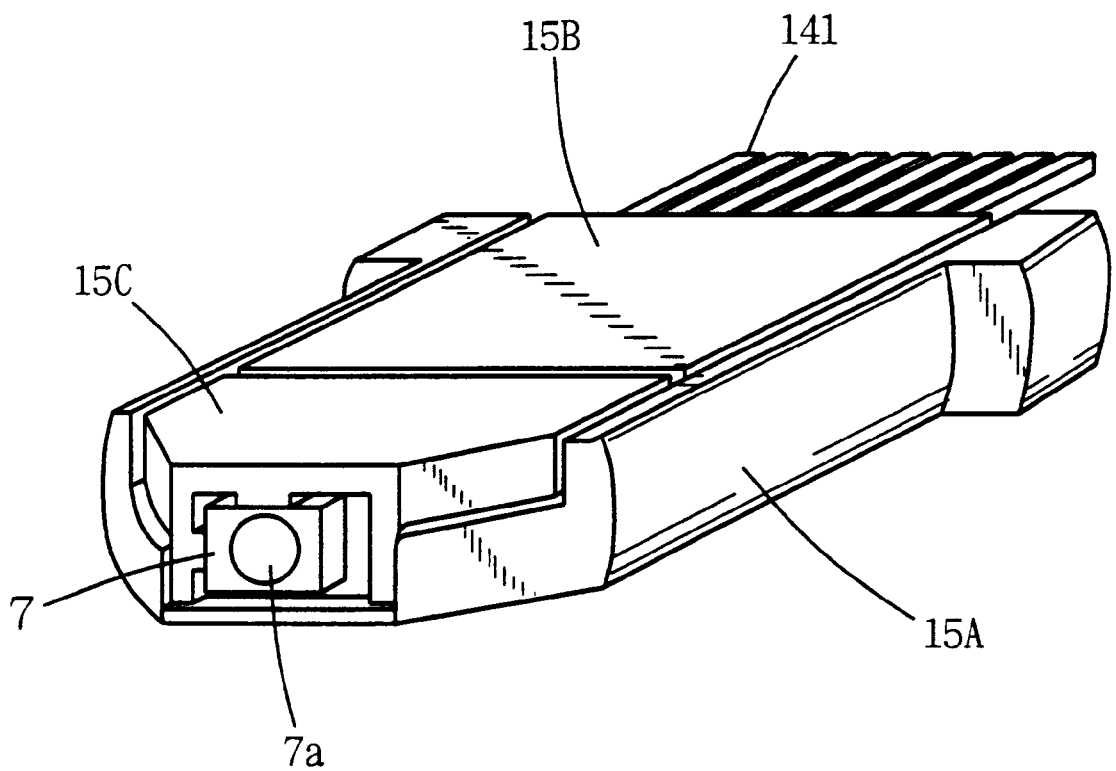
FIG. 13 is a perspective view showing the appearance of the optical pickup device shown in FIG. 10.
Figure 14:
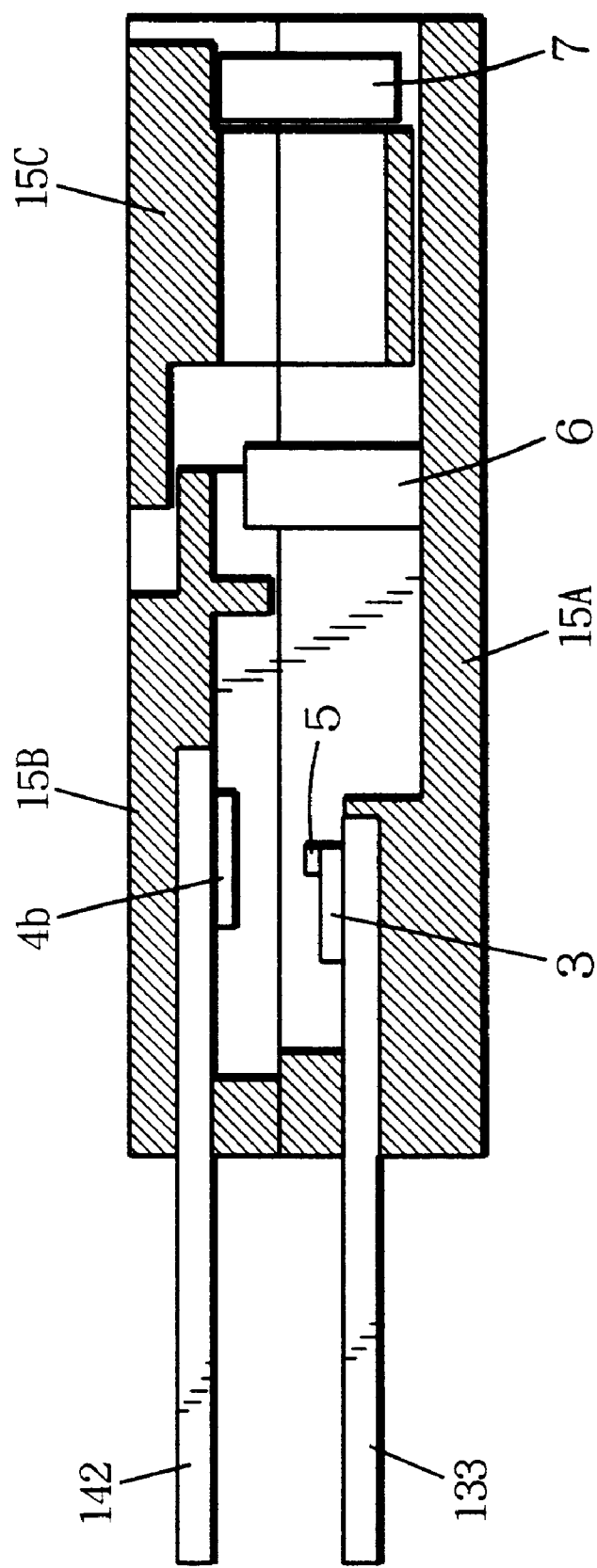
FIG. 14 is a sectional side elevation showing the construction of the optical pickup device shown in FIG. 10.
Figure 15:
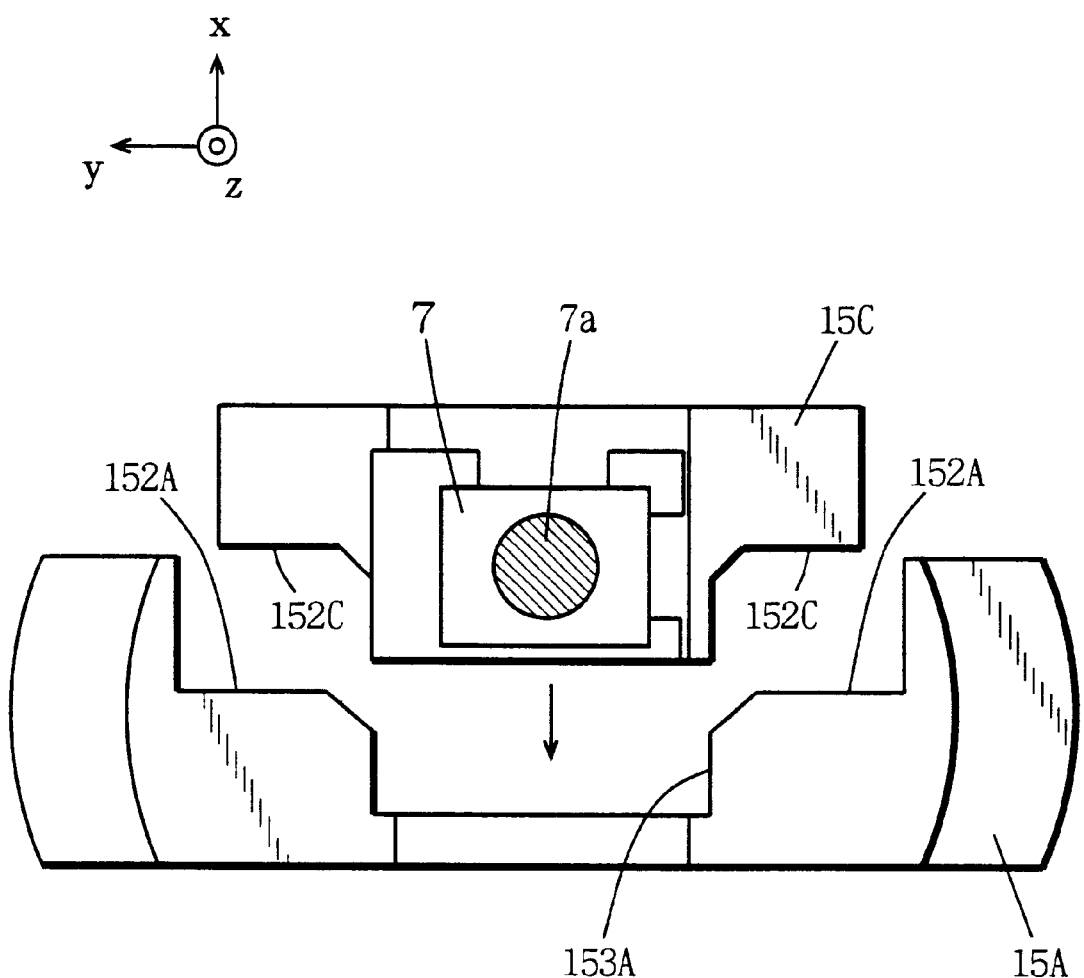
FIGS. 15 is a diagram showing a state where the lower frame member and a holographic optical element are joined to each other in the optical pickup device shown in FIG. 10.
Figure 16:
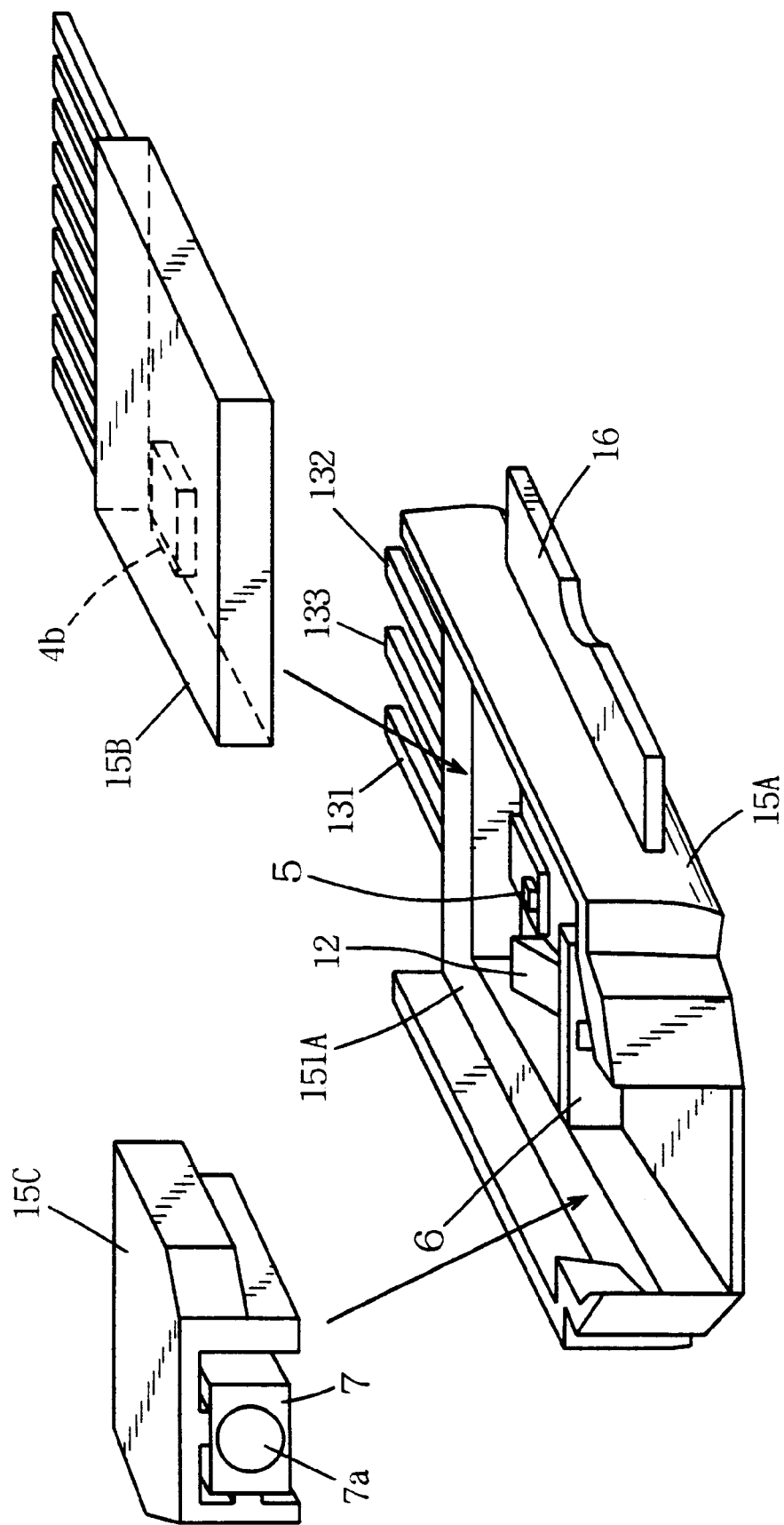
FIG. 16 is an exploded perspective view showing the construction of an optical pickup device according to a third embodiment.
Figure 17:
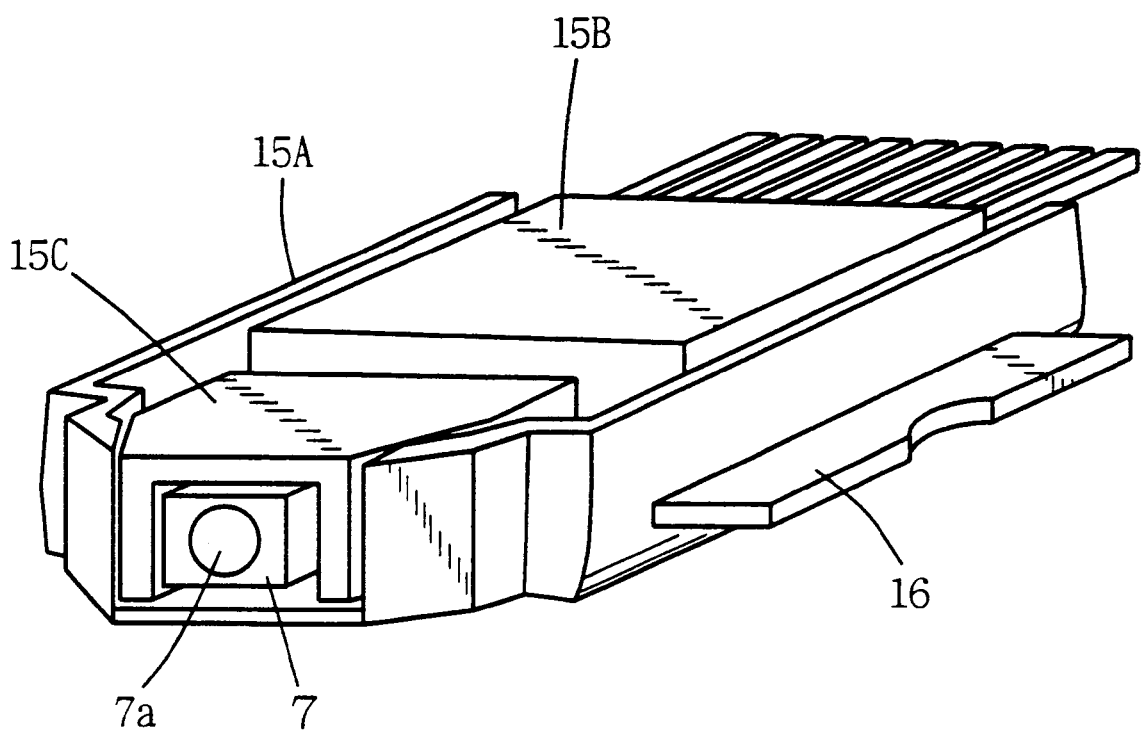
FIG. 17 is a perspective view showing the appearance of the optical pickup device shown in FIG. 16.
Figure 18:
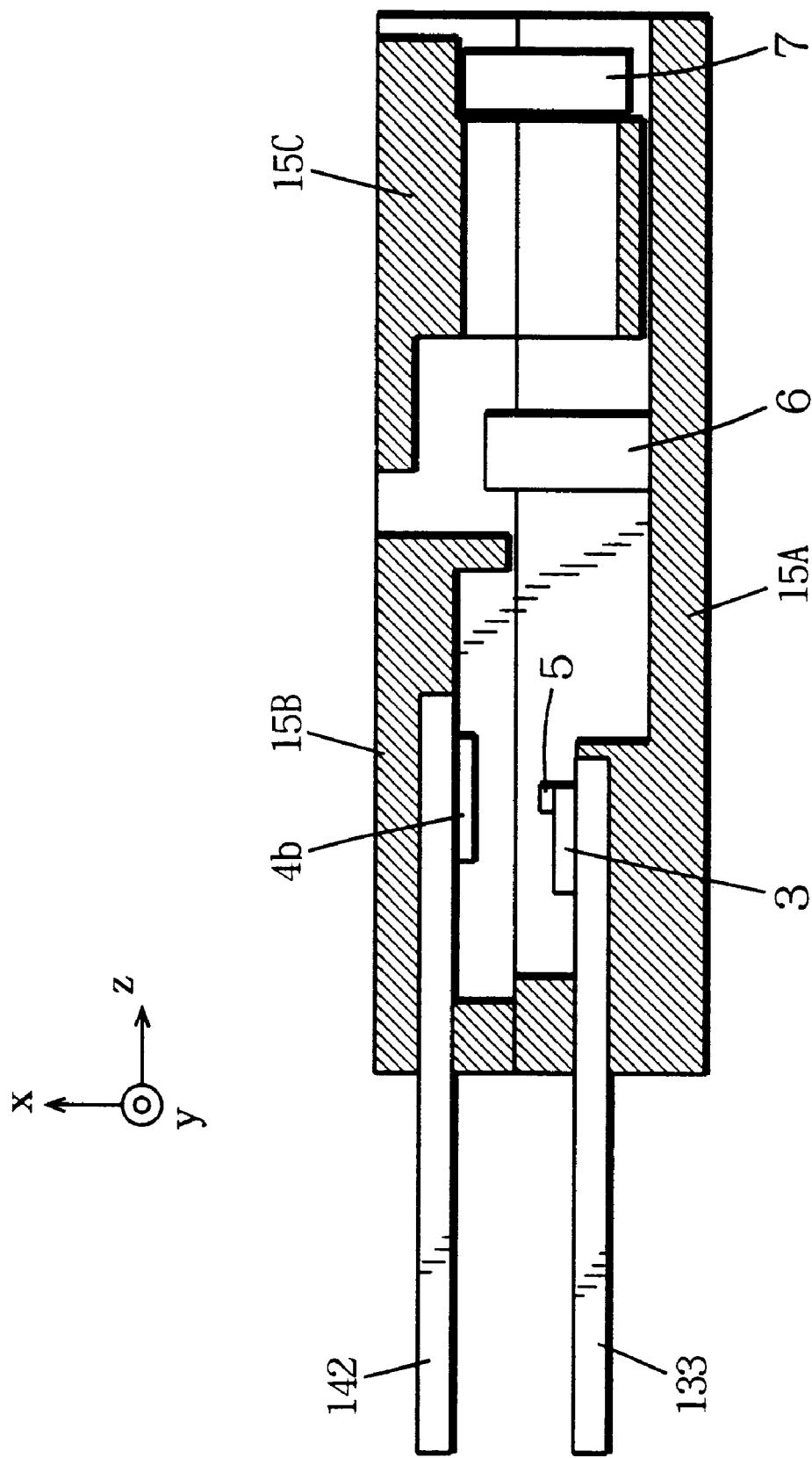
FIG. 18 is a sectional side elevation showing the construction of the optical pickup device shown in FIG. 16.

In the optical pickup device according to the first embodiment, the reflecting mirror 8 may be integrated upon being provided on the main surface of the lower frame member 11A, as shown in FIG. 9. Also in this case, the same effect can be obtained.

(2) Second Embodiment

FIGS. 10 to 15 illustrate the construction of a light emitting and receiving unit of an optical pickup device according to a second embodiment. The optical pickup device according to the second embodiment is the same as the optical pickup device according to the first embodiment in construction relating to the path of travel of laser light emitted from a semiconductor laser device. Therefore, the same optical components as those in the first embodiment are assigned the same reference numerals.

The light emitting and receiving unit of the optical pickup device according to the second embodiment has a case constructed by fixing a lower frame member 15A, an upper frame member 15B, and a holographic holding member 15C by adhesion. An electrically conducting heat sink 3, a transmission type three-beam generating diffraction grating 6, and a reflecting mirror 12 are mounted on a recess in the center of the lower frame member 15A. A photodiode 4a for laser power monitoring (not shown) and a semiconductor laser device 5 are mounted on the upper surface of the electrically conducting heat sink 3. Further, a photodiode 4b for detecting returned light reflected by the reflecting mirror 12 is mounted on the upper frame member 15B.

Furthermore, in the optical pickup device according to the second embodiment, a transmission type holographic optical element 7 is fixed to a lower end of the holographic holding member 15C.

The lower frame member 15A is provided with a lead frame 131 for outputting power from the photodiode 4a, a lead frame 132 for supplying power to the semiconductor laser device 5, and a lead frame 133 for grounding, for example, which is common to the photodiode 4a and the semiconductor laser device 5. One end of each of the lead frames 131, 132 and 133 is fixed to the lower frame member 15A, and the other end thereof projects outward from the lower frame member 15A.

The upper frame member 15B is provided with a plurality of lead frames 141 for respectively outputting signals from divided detecting regions of the photodiode 4b and a lead frame 142 for grounding, for example, which is common to the detecting regions of the photodiode 4b. One end of each of the lead frames 141 and 142 is fixed to the upper frame member 15B, and the other end thereof projects outward from the upper frame member 15B.

The lower frame member 15A and the upper frame member 15B are integrated by fixing a joint surface 151A of the lower frame member 15A and a joint surface 151B of the upper frame member 15B by adhesion. Further, the lower frame member 15A and the holographic holding member 15C are integrated by fixing the joint surface 151A of the lower frame member 15A and a joint surface 151C of the holographic holding member 15C by adhesion.

When the lower frame member 15A and the upper frame member 15B are integrated, they are formed so as to be movable in a two-dimensional manner along the joint surfaces 151A and 151B.

When respective joint surfaces 152A and 152C of the lower frame member 15A and the holographic holding member 15C are integrated, the holographic holding member 15C is formed so as to be movable in a one-dimensional manner in the direction of light emission of laser light (the z-axis direction in FIG. 14) along a guide surface 153A of the upper frame member 15A.

When the lower frame member 15A and the upper frame member 15B are fixed by adhesion, therefore, they are joined to each other after being positioned while being finely adjusted along a plane such that the position of the upper frame member 15B is its most suitable position with respect to the lower frame member 15A. Consequently, the position where returned light from an optical recording medium is incident on the photodiode 4b is adjustable in a two-dimensional manner along a plane (a y-z plane).

When the lower frame member 15A and the holographic holding member 15C are fixed by adhesion, they are joined to each other after being positioned while being finely adjusted in the direction of incidence and emission of the laser light such that the position of the holographic holding member 15C is in its most suitable position with respect to the lower frame member 15A. Consequently, it is possible to adjust in a one-dimensional manner the position where the returned light from the optical recording medium is incident on the photodiode 4b, that is, the position of the focus in the direction in which the lower frame member 15A and the upper frame member 15B are opposite to each other.

Also in the optical pickup device according to the second embodiment, the path of travel of the laser light is the same as that in the first embodiment described using FIGS. 7 and 8. That is, the laser light outputted from a front facet of the semiconductor laser device 5 is divided into zero-order and ±1st-order diffracted light beams by the transmission type three-beam generating diffraction grating 6, after which the three diffracted light beams are incident on the transmission type holographic optical element 7. The three diffracted light beams passing through the transmission type holographic optical element 7 are reflected upward by a reflecting mirror 8, and are then focused as a main spot and two sub-spots on an optical recording medium by the light-focusing function of an objective lens 9.

The three diffracted light beams focused as the main spot and the sub-spots on the optical recording medium are reflected as three returned light beams including information recorded on the optical recording medium, are reflected by the reflecting mirror 8 through the objective lens 9, and are incident on the transmission type holographic optical element 7.

The three returned light beams passing through the transmission type holographic optical element 7 by 1st-order (or −1st-order) diffraction pass on the right side or the left side of the diffraction grating surface 6a of the transmission type three-beam generating diffraction grating 6, are then reflected upward by the reflecting mirror 8, and are incident on the photodiode 4b.

The returned light beams incident on the photodiode 4b are converted into electric signals, and the electric signals are outputted from the lead frames 141. The information recorded on the optical recording medium is subjected to playback, tracking servo and focusing servo, as is well known.

Also in the optical pickup device according to the second embodiment, the lead frames 131, 132 and 133 which are connected to the semiconductor laser device 5 and the lead frames 141 and 142 which are connected to the photodiode 4b are not flush with each other but respectively provided in the lower frame member 15A and the upper frame member 15B which differ in height. Therefore, the necessity of making the case wider is eliminated, as compared with that in a case where the lead frames are flush with each other, so that it is possible to miniaturize the optical pickup device.

When the upper frame member 15B and the holographic holding member 15C are fixed to the lower frame member 15A by adhesion, they are fixed by adhesion after being positioned upon relatively moving the lower frame member 15A and the upper frame member 15B along the joint surfaces 151A and 151B and relatively moving the lower frame member 15A and the holographic holding member 15C along the joint surfaces 152A and 152C and the guide surface 153A. Consequently, the photodiode 4b can be so adjusted that the returned light beams from the optical recording medium are incident on its most suitable positions for incidence and its most suitable positions for focusing.

(3) Third Embodiment

FIGS. 16 to 20 illustrate an optical pickup device according to a third embodiment. The optical pickup device according to the third embodiment differs from the optical pickup device according to the second embodiment in the structures of lead frames. The same components as those in the optical pickup device according to the second embodiment are assigned the same reference numerals.

In a light emitting and receiving unit of the optical pickup device according to the third embodiment, a case is constituted by a lower frame member 15A, an upper frame member 15B, and a holographic holding member 15C. An electrically conducting heat sink 3, a transmission type three-beam generating diffraction grating 6, and a reflecting mirror 12 are mounted on a main surface of the lower frame member 15A. The reflecting mirror 12 reflects returned light from an optical recording medium upward. A photodiode 4a for laser power monitoring is provided on the upper surface of the electrically conducting heat sink 3, and a semiconductor laser device 5 is mounted thereon. A photodiode 4b for detecting the returned light reflected by the reflecting mirror 12 is provided on a main surface of the upper frame member 15B. Further, a transmission type holographic optical element 7 is fixed to the holographic holding member 15C.

As shown in FIG. 20, the optical pickup device comprises a housing 17 connected to the light emitting and receiving unit. The housing 17 has a recess 17a receiving the light emitting and receiving unit, and a reflecting mirror 8, an objective lens 9 and an actuator 18 for driving the objective lens 9 are mounted on the housing 17.

Figure 19:
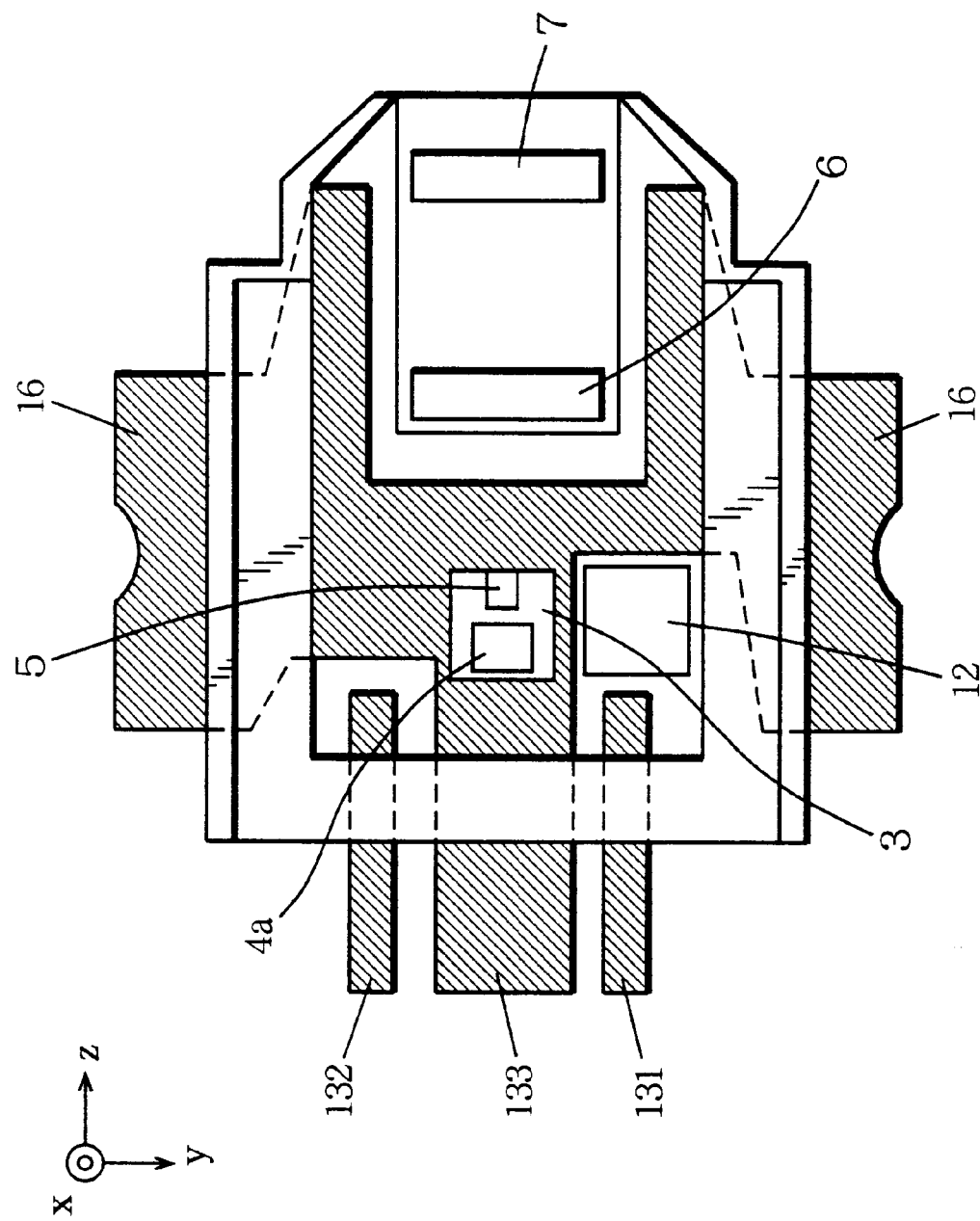
FIG. 19 is a plan sectional view showing the construction of the optical pickup device shown in FIG. 16.

As shown in FIG. 19, the lower frame member 15A is provided with a lead frame 131 for outputting a signal from the photodiode 4a, a lead frame 132 for supplying power to the semiconductor laser device 5, and a lead frame 133 for grounding, for example, which is common to the photodiode 4a and the semiconductor laser device 5. One end of each of the lead frames 131 to 133 is fixed to the lower frame member 15A, and the other end thereof projects outward from the lower frame member 15A. Further, the lead frame 133 has a heat radiating portion 16 projecting outward from a side surface of the lower frame member 15A.

The semiconductor laser device 5 is arranged on the upper surface of the lead frame 133 through the heat sink 3. The semiconductor laser device 5 generates heat at the time of light output, so that the generated heat must be discharged. Therefore, the heat sink 3 is provided. The heat from the semiconductor laser device 5 is conducted to the lead frame 133 through the heat sink 3, and is further radiated outward from the heat radiating portion 16.

In FIG. 20, the housing 17 has the recess 17a receiving the light emitting and receiving unit. The heat radiating portion 16 in the light emitting and receiving unit is so mounted as to be brought into contact with a contact surface 17b formed in the recess 17a. Consequently, the heat conducted to the heat radiating portion 16 from the semiconductor laser device 5 is conducted to the housing 17 through the contact surface 17b. Consequently, the heat from the semiconductor laser device 5 is moved toward the housing 17, so that the semiconductor laser device 5 is cooled.

The upper frame member 15B is provided with a plurality of lead frames 141 for outputting signals from respective divided detecting regions of the photodiode 4b and a lead frame 142 for grounding, for example, which is common to the respective detecting regions. One end of each of the lead frames 141 and 142 is fixed to the upper frame member 15B, and the other end thereof projects outward from the upper frame member 15B.

(4) Fourth Embodiment

Figure 21:
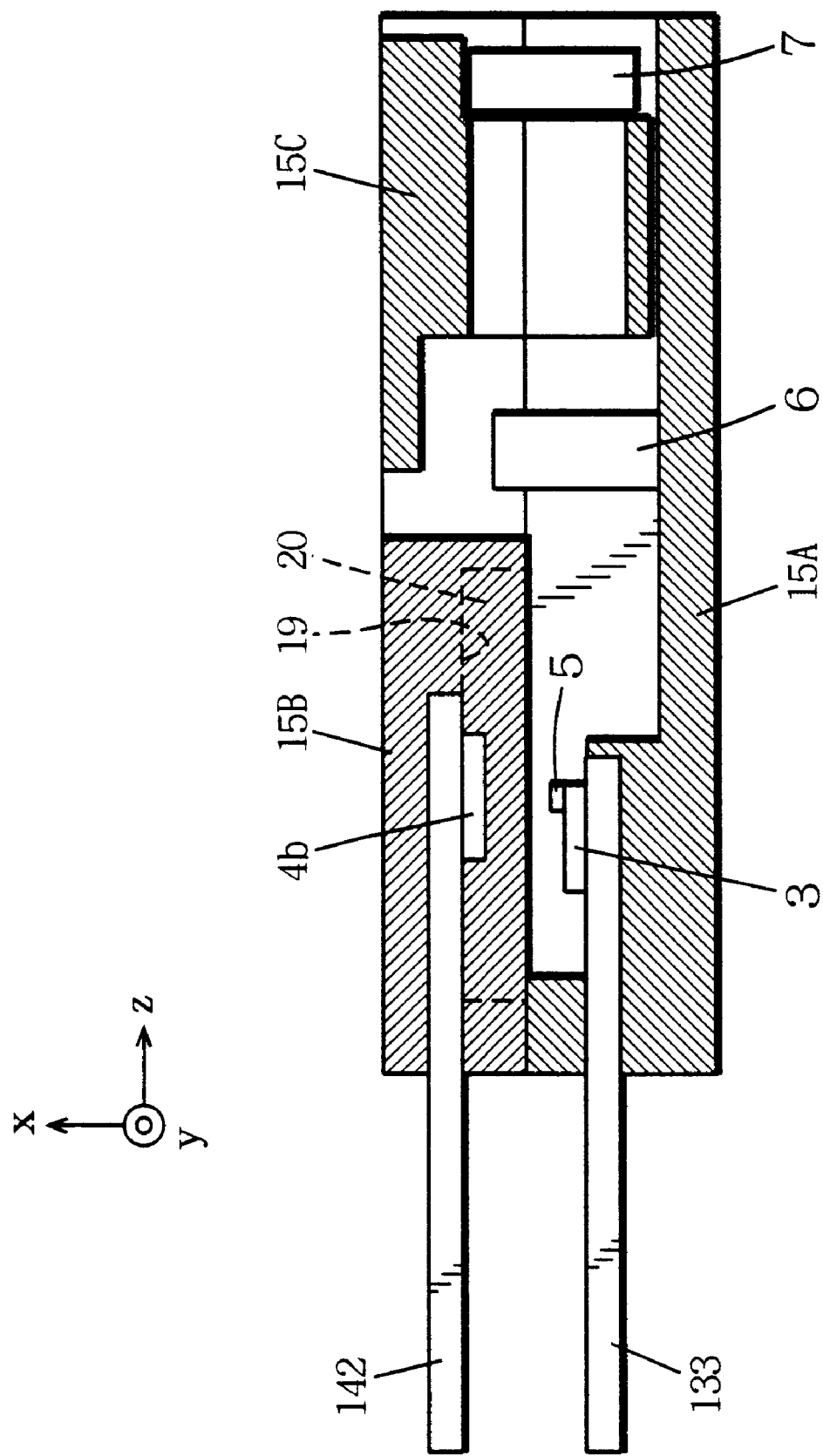
FIG. 21 is a sectional side elevation showing an optical pickup device according to a fourth embodiment of the present invention.
Figure 22:
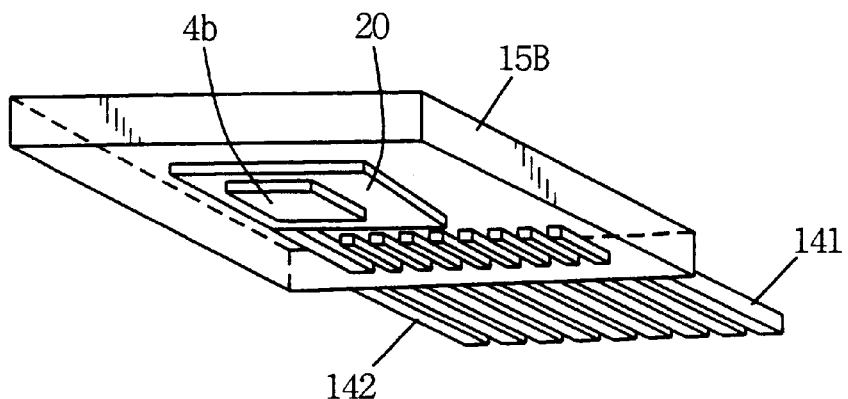
FIG. 22 is a perspective view showing an upper frame member of the optical pickup device shown in FIG. 21.
Figure 23:
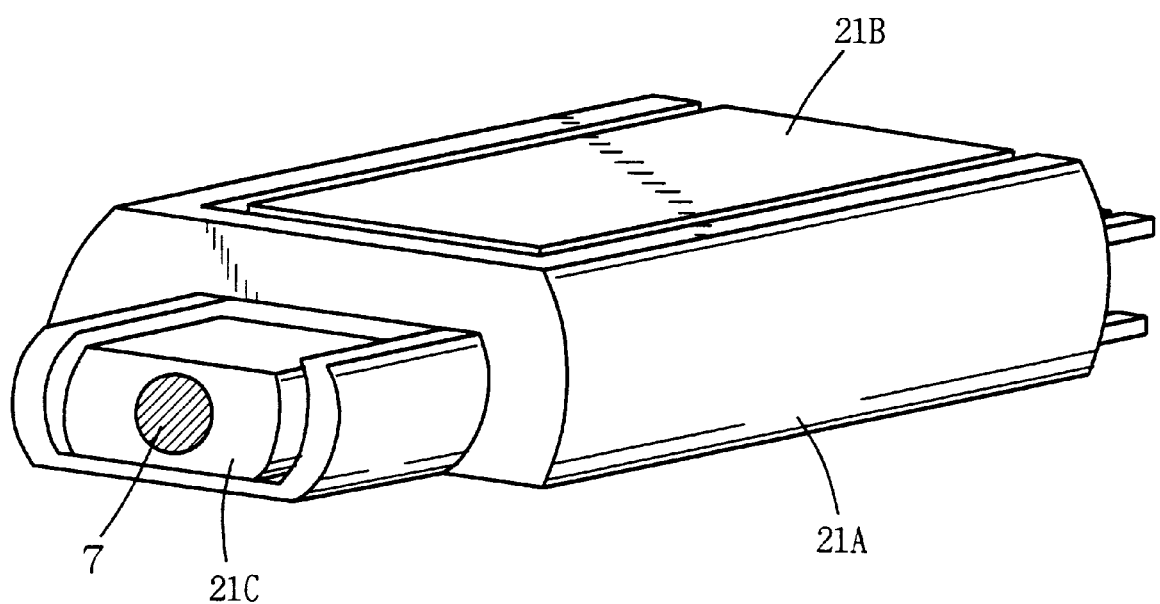
FIG. 23 is a perspective view showing the appearance of an optical pickup device according to a fifth embodiment of the present invention.
Figure 24:
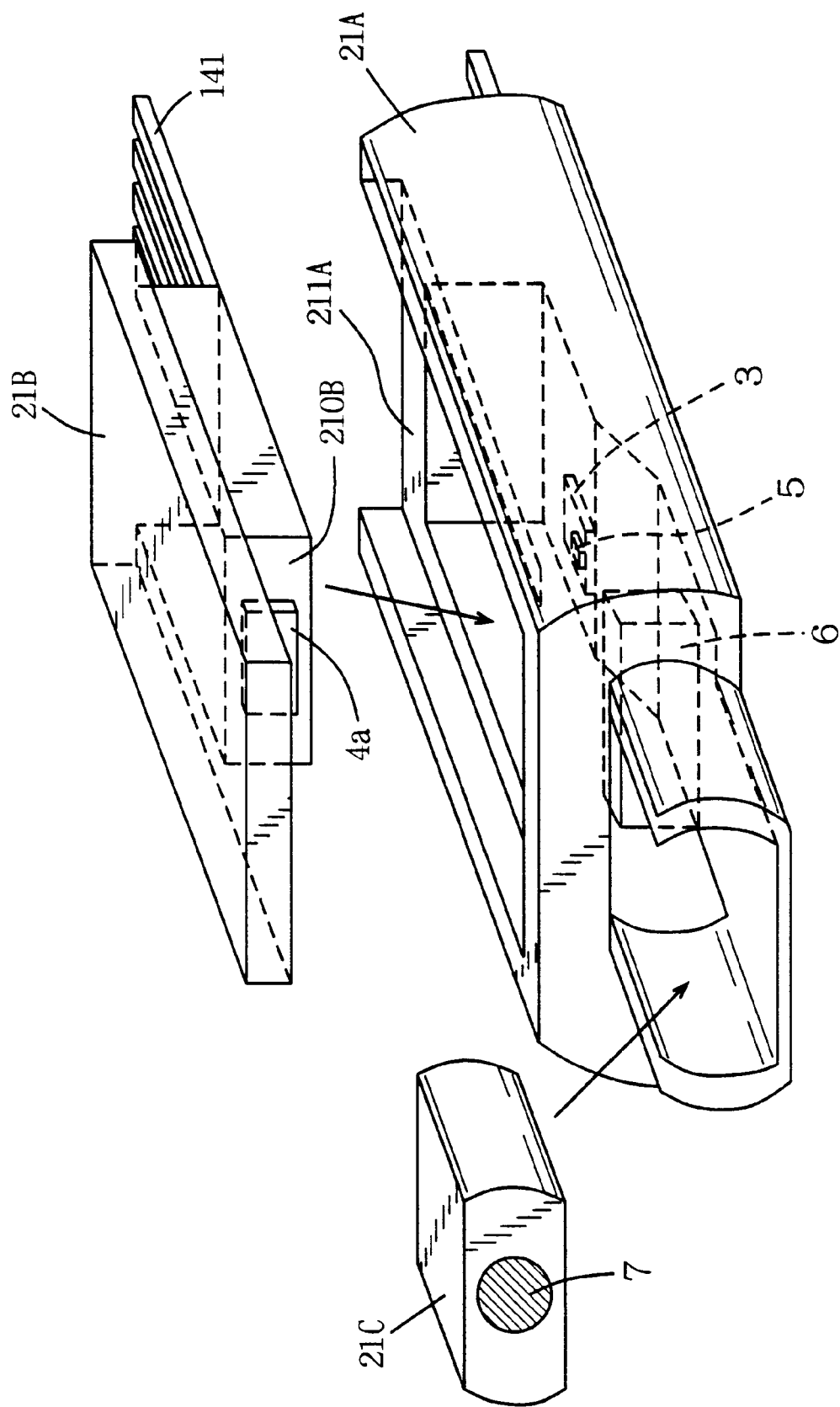
FIG. 24 is an exploded perspective view of the optical pickup device shown in FIG. 23.
Figure 25:
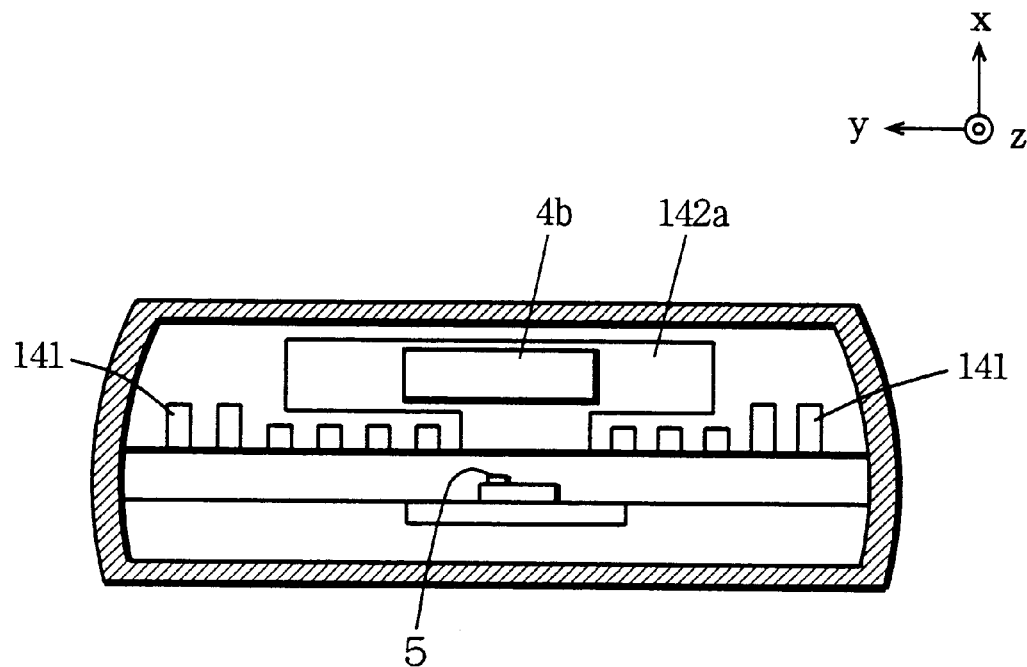
FIG. 25 is a front sectional view of the optical pickup device shown in FIG. 23.
Figure 26:
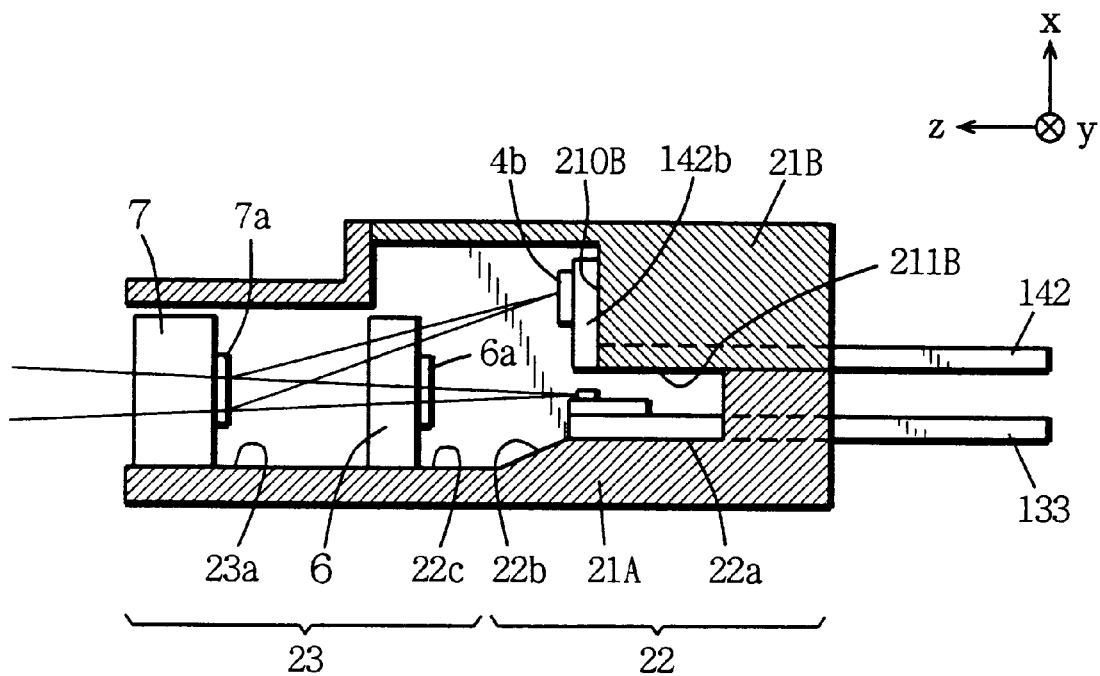
FIG. 26 is a sectional side elevation showing the optical pickup device shown in FIG. 23.
Figure 27:
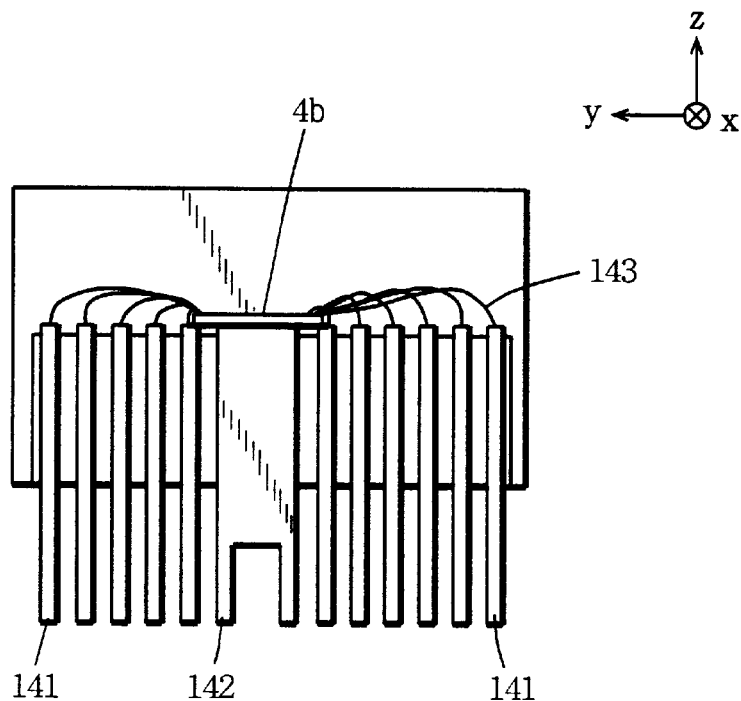
FIG. 27 is a plan view showing an upper frame member of the optical pickup device shown in FIG. 23.
Figure 28:
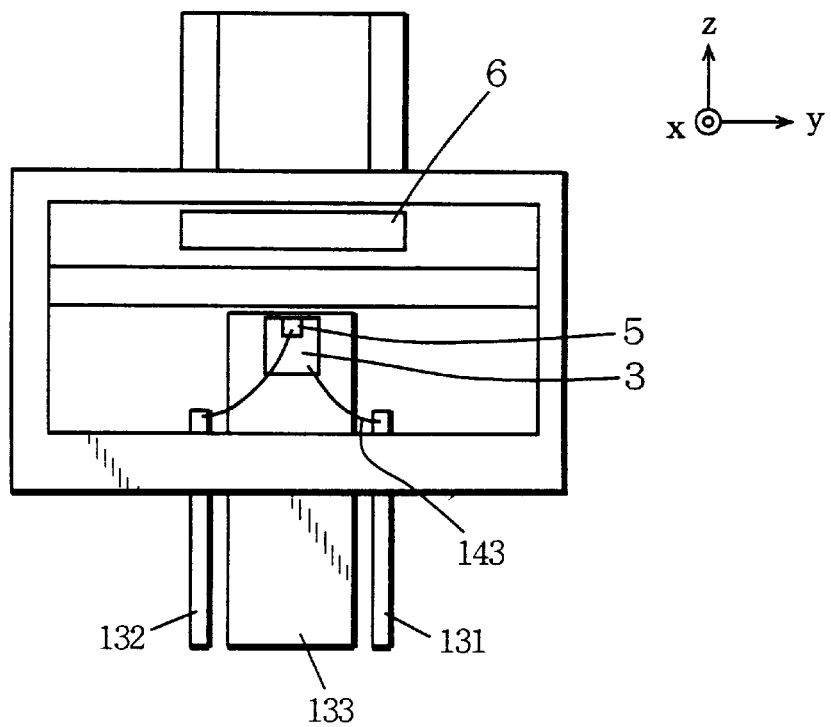
FIG. 28 is a plan view showing a lower frame member of the optical pickup device shown in FIG. 23.

FIG. 21 illustrates the cross-sectional structure of a light emitting and receiving unit of an optical pickup device according to a fourth embodiment, and FIG. 22 illustrates an upper frame member 15B. The optical pickup device according to the fourth embodiment differs from the optical pickup device according to the third embodiment in the structure of the upper frame member 15B.

The upper frame member 15B is formed of an opaque insulating material, for example, plastics or ceramics. A recess 19 is formed in the center of the lower surface of the upper frame member 15B, and respective ends of lead frames 141 and 142 are exposed in the recess 19. A photodiode 4b is mounted on the end of the lead frame 142. The photodiode 4b and each of the lead frames 141 and 142 are electrically connected to each other by a wire. The recess 19 in which the photodiode 4b is arranged is filled with transparent thermosetting resin such as acrylic resin. Consequently, the photodiode 4b and a wire connecting portion between the photodiode 4b and each of the lead frames 141 and 142 are protected by a coating portion 20 composed of transparent thermosetting resin.

Therefore, at the time of assembling the upper frame member 15B, the wire connecting portion of the photodiode 4b is prevented from being fractured by the contact with foreign matter. Further, moisture is prevented from entering, so that the humidity resistance of the photodiode 4b is improved.

Furthermore, the transparent thermosetting resin transmits returned light reflected from a reflecting mirror 12. Consequently, it is possible to sufficiently introduce the returned light into a detecting region of the photodiode 4b.

Not only the coating portion 20 in the upper frame member 15B but also the entire upper frame member 15B may be formed of the transparent thermosetting resin or the like.

(5) Fifth Embodiment

FIGS. 23 to 28 illustrate a light emitting and receiving unit of an optical pickup device according to a fifth embodiment. The optical pickup device according to the fifth embodiment has a case constructed by fixing a lower frame member 21A, an upper frame member 21B and a holographic holding member 21C each composed of a resin mold by adhesion. The lower frame member 21A comprises a first supporting portion 22 in which a semiconductor laser device 5 and the like are arranged and a second supporting portion 23 in which the holographic holding member 21C is arranged. The first supporting portion 22 is constituted by a bottom surface comprising an upper supporting surface 22a, an inclined surface 22b and a lower supporting surface 22c, and a side surface surrounding its periphery. The upper supporting surface 22a is formed in a position vertically above the lower supporting surface 22c, and an electrically conducting heat sink 3 is arranged on the surface thereof through a lead frame 133. The semiconductor laser device 5 is arranged on the upper surface of the electrically conducting heat sink 3.

A transmission type three-beam generating diffraction grating 6 is arranged on the lower supporting surface 22c. The three-beam generating diffraction grating 6 has a diffraction grating surface 6a composed of concavities and convexities at an equal period formed on its surface on the side of the semiconductor laser device 5, and divides laser light emitted from the semiconductor laser device 5 into three zero-order and ±1st-order diffracted light beams and emits the diffracted light beams.

The second supporting portion 23 in the lower frame member 21A is so formed as to be narrower than the first supporting portion 22. A bottom surface 23a and both side surfaces constitute a housing portion for holding the holographic holding member 21C.

The holographic holding member 21C has a transmission type holographic optical element 7 in its inner part. The holographic holding member 21C is mounted on the second supporting portion 23, and is moved along the z-axis, so that the position of the transmission type holographic optical element 7 is adjusted.

The lower frame member 21A is provided with a lead frame 131 for outputting a signal from a photodiode 4a, a lead frame 132 for supplying power to the semiconductor laser device 5, and a lead frame 133 for grounding, for example, which is common to the photodiode 4a and the semiconductor laser device 5. An end of each of the lead frames 131 to 133 projects outward from the lower frame member 21A.

The upper frame member 21B is provided with a plurality of lead frames 141 for respectively outputting signals from divided detecting regions of the photodiode 4b and a lead frame 142 for grounding, for example, which is common to the detecting regions. Further, the upper frame member 21B is so formed as to cover the upper surface of the first supporting portion 22 in the lower frame member 21A, and has a vertical surface 210B. An end of each of the lead frames 141 and 142 is arranged along a horizontal surface 211B in the upper frame member 21B, and its leading end is folded along the vertical surface 210B. The photodiode 4b is mounted on a folded leading end 142a of the lead frame 142. Consequently, the detecting regions of the photodiode 4b are arranged in a vertical direction. Further, the photodiode 4b is electrically connected to the ends of the plurality of lead frames 141 and 142 by wires 143. The end of each of the lead frames 141 and 142 projects outward from the upper frame member 21B.

In the optical pickup device having the light emitting and receiving unit, the laser light outputted from a front facet of the semiconductor laser device 5 is divided into three zero-order and ±1st-order diffracted light beams by the transmission type three-beam generating diffraction grating 6, after which the diffracted light beams are incident on the transmission type holographic optical element 7. The three diffracted light beams passing through the transmission type holographic optical element 7 are reflected upward by a reflecting mirror (not shown), and are focused as a main spot and two sub-spots on an optical recording medium using the light-focusing function of an objective lens (not shown).

The three diffracted light beams focused as the main spot and the two sub-spots on the optical recording medium are reflected as three returned light beams including information recorded on the optical recording medium, are reflected by the reflecting mirror through the objective lens, and are incident on the transmission type holographic optical element 7.

The three returned light beams passing through the transmission type holographic optical element 7 by 1st (or −1st)-order diffraction pass above the diffraction grating surface 6a of the transmission type three-beam generating diffraction grating 6, and are then incident on the photodiode 4b mounted on the vertical surface 210B in the upper frame member 21B. The returned light beams incident on the photodiode 4b are converted into electric signals, and the electric signals are outputted from the lead frames 141. The information recorded on the optical recording medium is subjected to reproduced, tracking servo and focusing servo on the basis of the outputted electric signals.

(6) Sixth Embodiment

Figure 29:
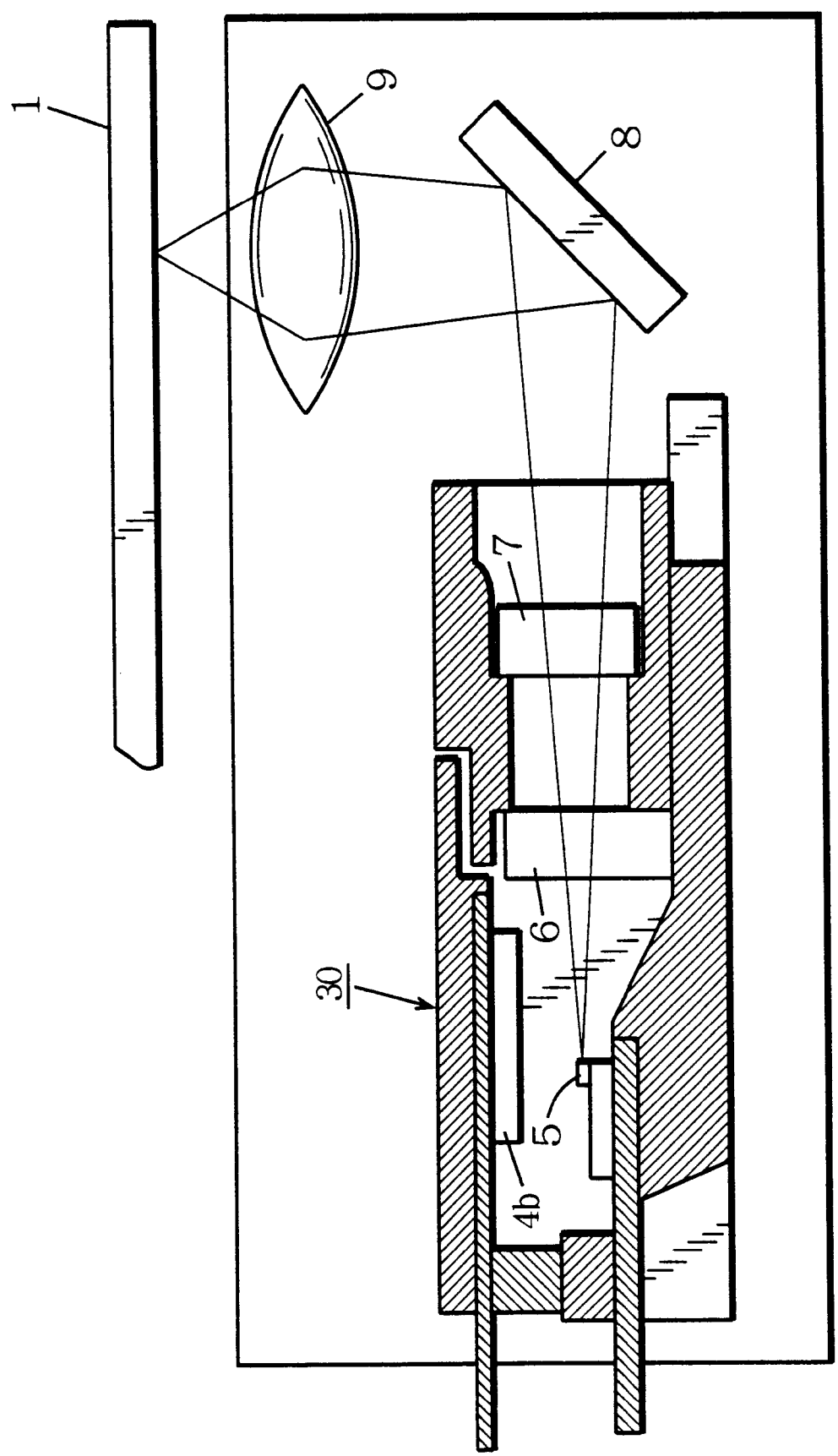
FIG. 29 is a sectional side elevation of the optical pickup device according to a sixth embodiment of the present invention.
Figure 30:
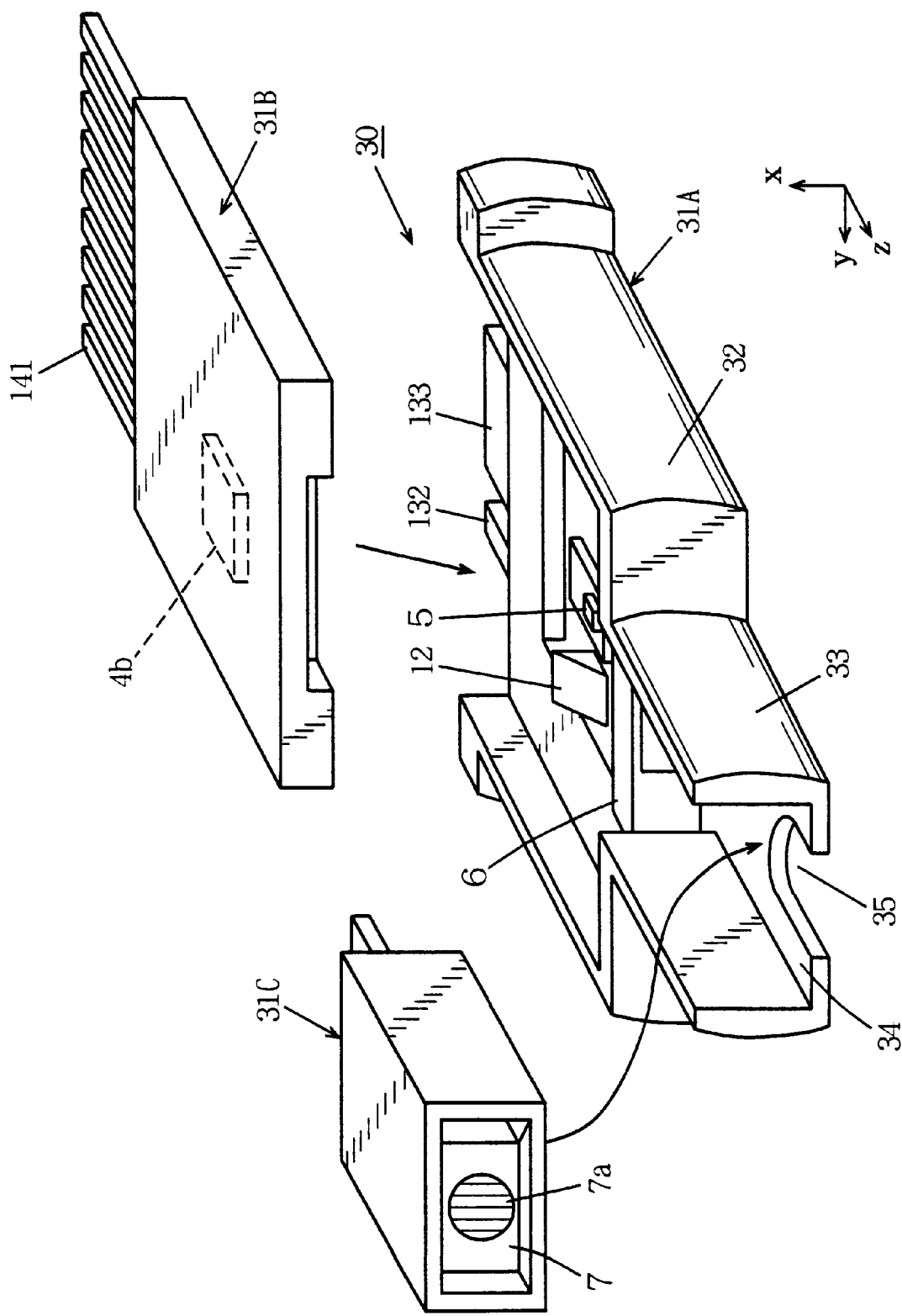
FIG. 30 is an exploded perspective view showing a light receiving unit of the optical pickup device shown in FIG. 29.
Figure 31:
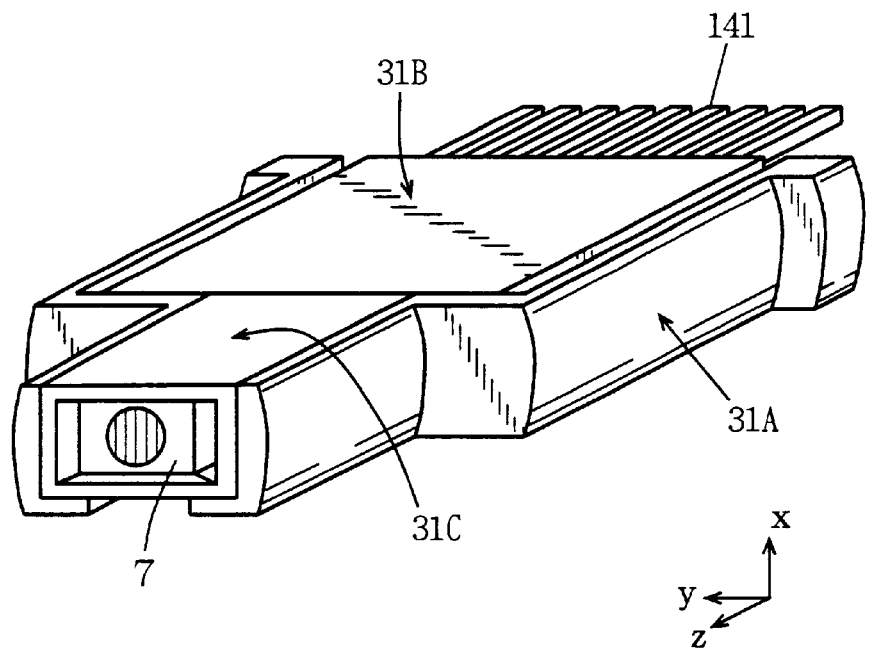
FIG. 31 is a perspective view showing the appearance of a state where the light receiving unit shown in FIG. 30 is assembled.
Figure 32:
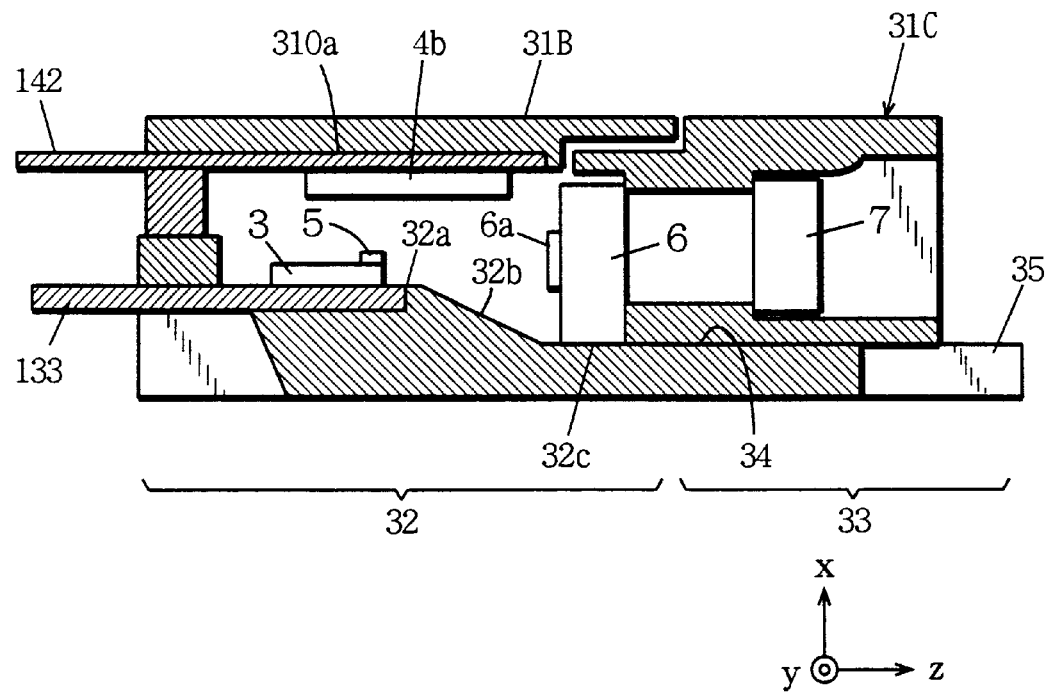
FIG. 32 is a sectional side elevation of the light receiving unit shown in FIG. 31.

In FIG. 29, an optical pickup device according to a sixth embodiment comprises a light emitting and receiving unit 30 formed as a unit by a semiconductor laser device 5, a three-beam generating diffraction grating 6, a transmission type holographic optical element 7, and the like, a reflecting mirror 8, and a condenser lens 9.

In FIGS. 29 to 32, the light emitting and receiving unit 30 is constructed by joining a lower frame member 31A, an upper frame member 31B and a holographic holding member 31C each composed of a resin mold to each other.

The lower frame member 31A comprises a first supporting portion 32 in which a semiconductor laser device 5 and the like are arranged and a second supporting portion 33 in which the holographic holding member 31C is arranged. The first supporting portion 32 is constituted by a bottom surface comprising an upper supporting surface 32a, an inclined surface 32b and a lower supporting surface 32c, and a side surface surrounding its periphery. The upper supporting surface 32a is formed in a position vertically above the lower supporting surface 32c, and an electrically conducting heat sink 3 is arranged on the surface thereof through a lead frame 133. The semiconductor laser device 5 is arranged on the upper surface of the electrically conducting heat sink 3.

The semiconductor laser device 5 is so arranged that the direction of emission of laser light is approximately parallel to the upper supporting surface 32a. A reflecting mirror 12 is arranged beside the semiconductor laser device 5. The reflecting mirror 12 reflects returned light from an optical recording medium 1 vertically upward. The transmission type three-beam generating diffraction grating 6 is arranged on the lower supporting surface 32c. The three-beam generating diffraction grating 6 has a diffraction grating surface 6a composed of concavities and convexities at an equal period formed on its surface on the side of the semiconductor laser device 5, and divides the laser light emitted from the semiconductor laser device 5 into three zero-order, +1st-order and −1st-order diffracted light beams and emits the diffracted light beams.

The second supporting portion 33 in the lower frame member 31A is so formed as to be narrower than the first supporting portion 32, and a bottom surface 34 and both side surfaces constitute a housing portion for holding the holographic holding member 31C. Further, a notch 35 is formed at a leading end of the bottom surface 34. The notch 35 performs a function as described later, and the shape thereof is not particularly limited.

The holographic holding portion 31C has the transmission type holographic optical element 7 in its inner part. The holographic holding member 31C is mounted on the second supporting portion 33, and is moved along the z-axis, so that the position of the transmission type holographic optical element 7 is adjusted.

The upper frame member 31B is formed in the shape of a flat plate covering the upper surface of the first supporting portion 32 in the lower frame member 31A, and has a supporting surface 310a approximately parallel to the upper supporting surface 32a of the lower frame member 32. A photodiode 4b is arranged on the supporting surface 310a through a lead frame 142. Further, a plurality of lead frames 141 and 142 electrically connected to the photodiode 4b are arranged in the vicinity of the photodiode 4b.

Figure 33:
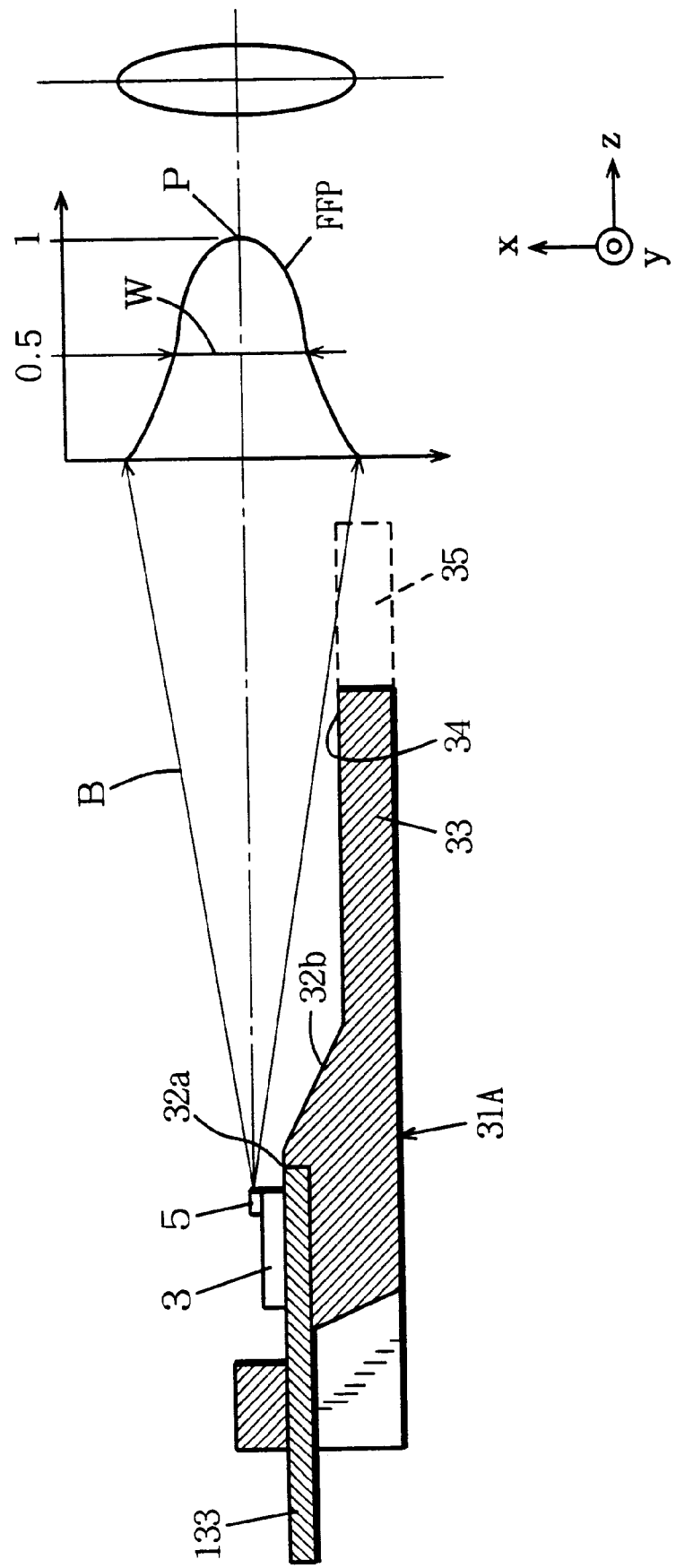
FIG. 33 is an explanatory view showing the step of inspecting the semiconductor laser device.

In the fabricating steps of the optical pickup device having the above-mentioned structure, the inspection of the light output characteristics of the semiconductor laser device 5 is made. FIG. 33 is an explanatory view showing the step of inspecting the semiconductor laser device. The semiconductor laser device 5 is inspected in a state where the electrically conducting heat sink 3, the semiconductor laser device 5, and lead frames 131 to 133 are arranged. Laser light emitted from the semiconductor laser device 5 is incident on a light receiving surface of an inspecting device arranged in a predetermined position ahead of the semiconductor laser device 5, to detect a far-field image of the laser light. Further, light output characteristics of the laser light, the shift in position for light emission of the laser light, and the like, are detected on the basis of the far-field pattern.

When laser light B is emitted from the semiconductor laser device 5, the optical axis of the laser light B travels in a direction approximately parallel to the upper supporting surface 32a. Further, the laser light B has the shape of an ellipse in cross section having a major axis in a vertical direction (the x-axis direction), and is enlarged as it travels. Consequently, a lower end of the laser light B approaches the bottom surface 34 of the second supporting portion 33 in the lower frame member 31A along the direction of light emission. On the other hand, the notch 35 is formed at the leading end of the bottom surface 34 of the second supporting portion 33. Consequently, the laser light B diffused in the x-axis direction (the −x-axis direction) travels upon passing through the notch 35, and is prevented from being interrupted by the bottom surface 34 of the second supporting portion 33.

Therefore, it is possible to obtain an accurate far-field pattern FFP on the light receiving surface of the inspecting device arranged ahead of the semiconductor laser device 5 in the direction of emission of the laser light. An accurate half-width W and an accurate peak position P are obtained on the basis of the detected far-field image FFP, so that it is possible to accurately measure and detect the light output characteristics and the shift in position in the direction of light emission of the semiconductor laser device 5.

In the lower frame member 31A, the upper supporting surface 32a of the first supporting portion 32 is formed in a position vertically above the bottom surface 34 of the second supporting portion 33 in addition to the provision of the notch 35. Consequently, a region where the laser light B emitted from the semiconductor laser device 5 interferes with the bottom surface 34 of the second supporting portion 33 is narrowed, reducing the notch 35.

Furthermore, the inclined surface 32b is provided between the upper supporting surface 32a and the lower supporting surface 32c, whereby a step is formed between the upper supporting surface 32a and the lower supporting portion 32c, to prevent the laser light B from interfering therebetween.

(7) Seventh Embodiment

Figure 34:
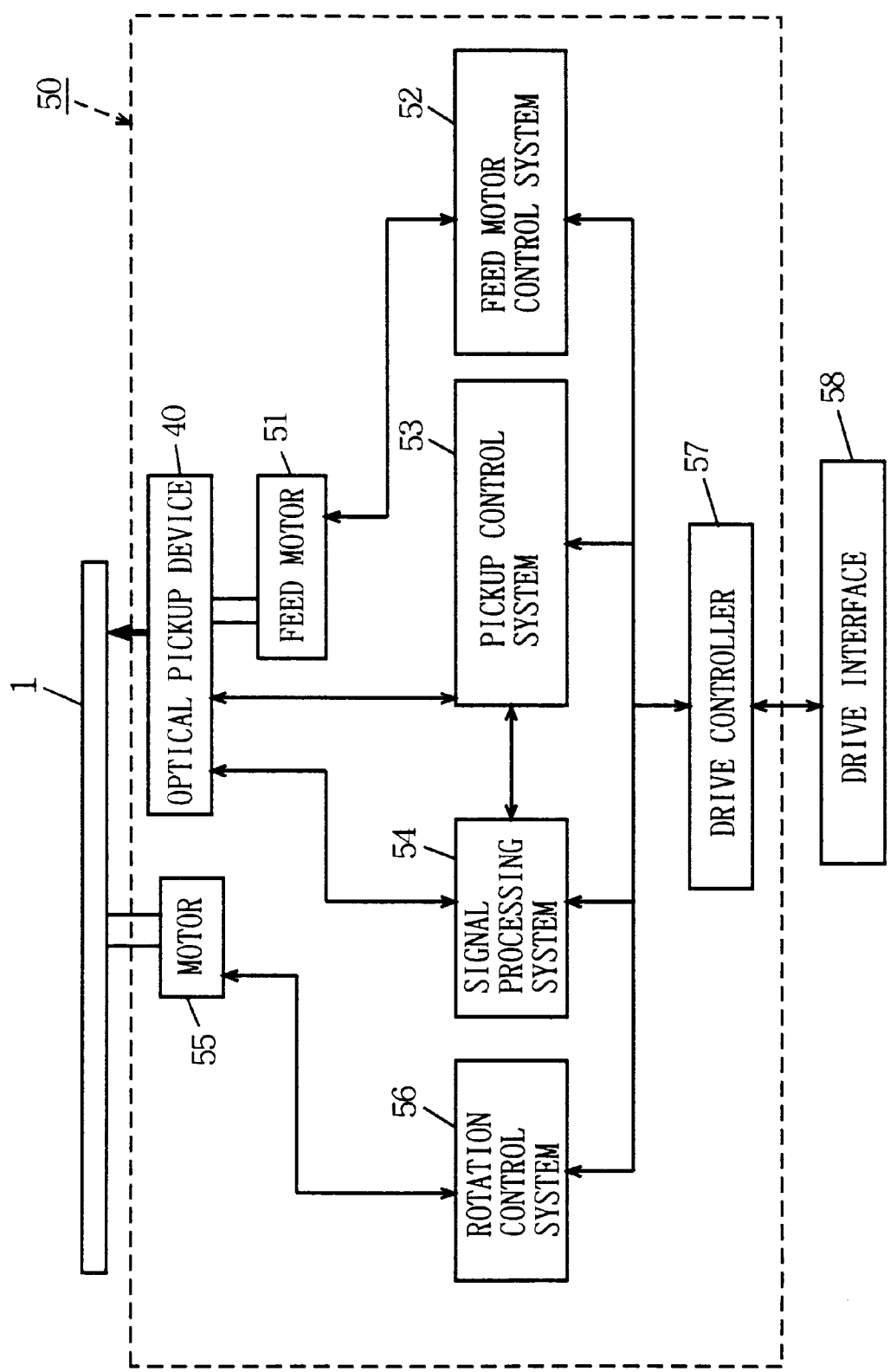
FIG. 34 is a block diagram showing the construction of an optical recording medium driving apparatus using an optical pickup device.
Figure 35:
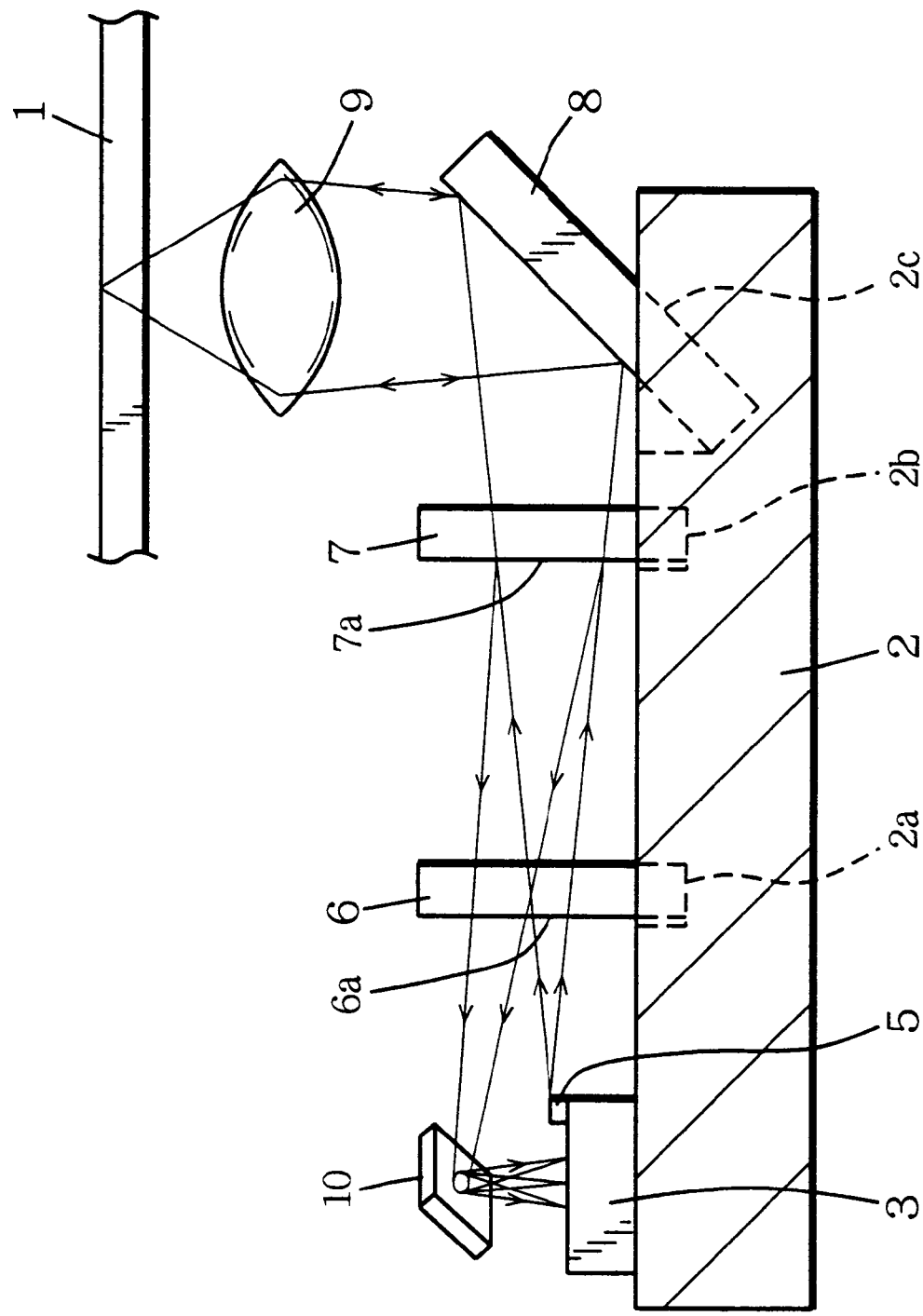
FIG. 35 is a sectional side elevation of a conventional optical pickup device.
Figure 36:
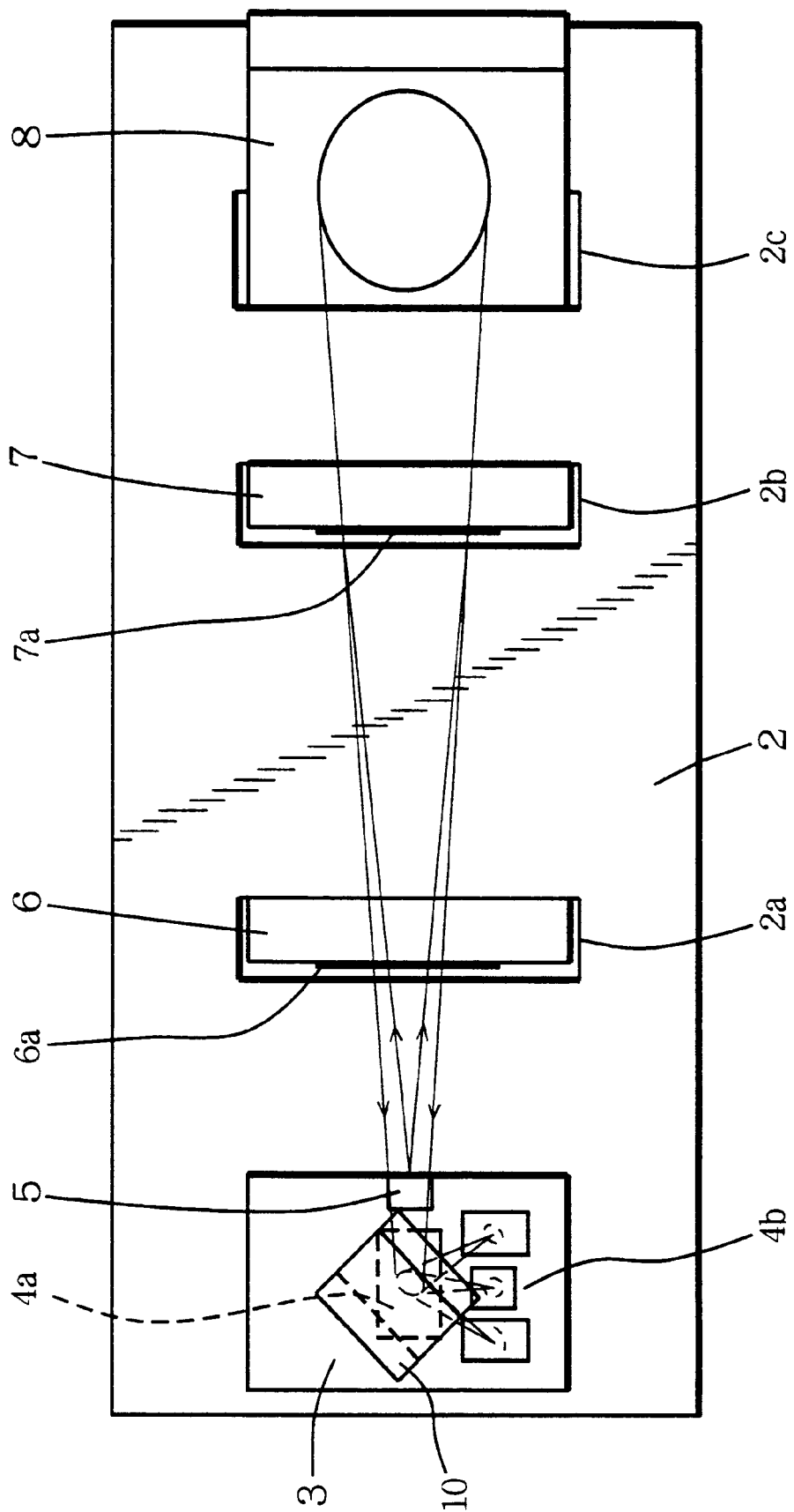
FIG. 36 is a plan view of the conventional optical pickup device.
Figure 37:
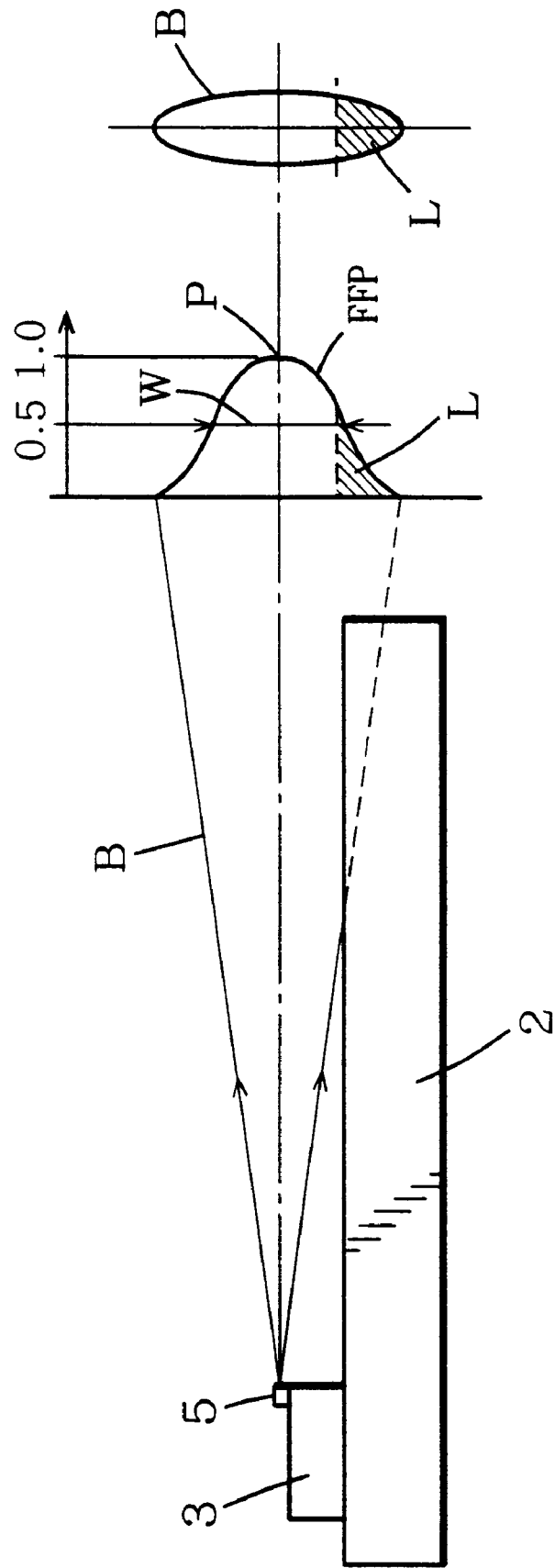
FIG. 37 is an explanatory view showing the step of inspecting a semiconductor laser device in the conventional optical pickup device.

Description is now made of an optical recording medium driving apparatus using each of the optical pickup devices according to the first to sixth embodiments. As shown in FIG. 34, an optical recording medium driving apparatus 50 has a motor 55 for rotating an optical recording medium 1 and a rotation control system 56 for controlling the operation of the motor 55. An optical pickup device 40 is arranged on the lower surface of the optical recording medium 1. In the optical pickup device 40, its position for detection is moved along the radius of the optical recording medium 1 by a feed motor 51. The operation of the feed motor 51 is controlled by a feed motor control system 52. Further, the operation of the optical pickup device 40 is controlled by a pickup control system 53, and a detection signal from the optical pickup device 40 is processed by a signal processing system 54. The operation of each processing system of the optical recording medium driving apparatus 50 is controlled by a drive controller 57.

The optical recording medium driving apparatus 50 is connected to a recording and reproduction device through a drive interface 58, to perform information reproduction processing and the like based on the detection signal. It is possible to accurately read out information from the optical recording medium by using each of the optical pickup devices according to the first to sixth embodiments for the optical recording medium driving apparatus 50.

The notch 35 in the lower frame member 31A in the above-mentioned sixth embodiment may be provided in each of the lower frame members in the optical pickup devices according to the first to fifth embodiments. Consequently, it is possible to accurately make the output inspection of the semiconductor laser device in the steps of fabricating the optical pickup device.

The heat radiating portion provided in the lead frame in the optical pickup device according to the third embodiment may be provided in the corresponding lead frame in the optical pickup device according to the other embodiment. This makes it possible to prevent the temperature from being raised by heat generation of the semiconductor laser device at the time of operating the semiconductor laser device.

Furthermore, the coating portion 20 and the upper frame member 15B each composed of a transparent material in the optical pickup device according to the fourth embodiment are applicable to the upper frame members in the first to third embodiments and the fifth and sixth embodiments.

Consequently, it is possible to protect a region in the vicinity of the photodiode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device comprising:
   a first supporting member;
   a second supporting member arranged on said first supporting member;
   a first lead frame member provided in said first supporting member;
   a second lead frame member provided in said second supporting member;
   a light source provided on said first supporting member and electrically connected to said first lead frame member for emitting light; and
   a photodetector provided in said second supporting member and electrically connected to said second lead frame member for detecting returned light based on the light emitted from said light source.

2. The optical pickup device according to claim 1, wherein
   said first supporting member has a first surface,
   said second supporting member has a second surface opposite to said first surface so as to be approximately parallel thereto,
   said light source is so arranged as to emit the light in a direction parallel to said first surface, and
   said photodetector is so arranged as to receive said returned light incident thereon in a direction parallel to said second surface.

3. The optical pickup device according to claim 2, wherein
   said first supporting member and said second supporting member respectively have joint surfaces parallel to said first surface, and
   said first supporting member and said second supporting member are joined to each other so as to be relatively movable along said joint surfaces at the time of assembling.

4. The optical pickup device according to claim 2, wherein
   said first lead frame member is so arranged as to be parallel to said first surface, and
   said second lead frame member is so arranged as to be parallel to said second surface.

5. The optical pickup device according to claim 2, further comprising
   a reflecting member arranged on said first supporting member for reflecting and guiding said returned light to said photodetector.

6. The optical pickup device according to claim 2, wherein
   said photodetector has a light receiving surface receiving said returned light, and
   said light receiving surface is so arranged as to be parallel to the direction of light emission from said light source.

7. The optical pickup device according to claim 6, wherein
   said second supporting member has a covering portion for covering said photodetector, and at least said covering portion of said second supporting member is composed of a transparent material.

8. The optical pickup device according to claim 6, wherein
said light source is mounted on said first lead frame member, and
said photodetector is mounted on said second lead frame member.

9. The optical pickup device according to claim 8, wherein
said light source is a semiconductor laser device for emitting laser light.

10. The optical pickup device according to claim 9, further comprising
a first diffraction element arranged on the light emission side of said semiconductor laser device for diffracting returned light based on the laser light emitted from said semiconductor laser device, and
an optical system for guiding said returned light diffracted by said first diffraction element into said photodetector.

11. The optical pickup device according to claim 10, further comprising
a third supporting member mounted on said first supporting member,
said first diffraction element is mounted on said third supporting member.

12. The optical pickup device according to claim 11, wherein
said first supporting member has a guide surface for guiding said third supporting member such that said first diffraction element is movable in the direction of light emission from said semiconductor laser device.

13. The optical pickup device according to claim 10, wherein
said first diffraction element is arranged on said first surface of said first supporting member.

14. The optical pickup device according to claim 10, wherein
said first diffraction element is a transmission type holographic optical element.

15. The optical pickup device according to claim 10, further comprising
a second diffraction element arranged between said semiconductor laser device and said first diffraction element for dividing the laser light emitted from said semiconductor laser device into a plurality of light beams.

16. The optical pickup device according to claim 15, further comprising
a focusing element for focusing the laser light emitted from said semiconductor laser device on an optical recording medium.

17. The optical pickup device according to claim 6, further comprising
a reflecting member arranged on said first supporting member for reflecting and focusing said returned light to said light receiving surface of said photodetector.

18. The optical pickup device according to claim 2, wherein
said photodetector has a light receiving surface for receiving said returned light and is so arranged as to be perpendicular to the direction of light emission from said light source.

19. The optical pickup device according to claim 18, wherein
said light source is mounted on said first lead frame member, and said photodetector is mounted on said second lead frame member.

20. The optical pickup device according to claim 19, wherein
said light source is a semiconductor laser device for emitting the laser light.

21. The optical pickup device according to claim 20, wherein
said second supporting member has a third surface perpendicular to the direction of light emission from said semiconductor laser device,
a folded portion folded along said third surface is formed at a leading end of said second lead frame member, and
said photodetector is arranged in said folded portion of said second lead frame member.

22. The optical pickup device according to claim 21, further comprising
a first diffraction element arranged on the light emission side of said semiconductor laser device for diffracting returned light based on the laser light emitted from said semiconductor laser device and focusing the returned light into said photodetector.

23. The optical pickup device according to claim 22, further comprising
a third supporting member mounted on said first supporting member,
said diffraction element being mounted on said third supporting member.

24. The optical pickup device according to claim 22, wherein
said first diffraction element is a transmission type holographic optical element.

25. The optical pickup device according to claim 22, further comprising
a second diffraction element arranged between said semiconductor laser device and said first diffraction element for dividing the laser light emitted from said semiconductor laser device into a plurality of light beams.

26. The optical pickup device according to claim 25, further comprising
a focusing element for focusing the laser light emitted from said semiconductor laser device on the optical recording medium.

27. The optical pickup device according to claim 2, wherein
said first supporting member has a flat shape parallel to said first surface.

28. The optical pickup device according to claim 2, wherein
a notch for passing the light emitted from said light source is formed at a leading end of said first supporting member in said direction of light emission.

29. The optical pickup device according to claim 28, further comprising
a first diffraction element for diffracting returned light based on the light emitted from said light source, and
said leading end of said first supporting member has a supporting surface for supporting said first diffraction element.

30. The optical pickup device according to claim 29, wherein
said light source is a semiconductor laser device,
said semiconductor laser device emits laser light in the shape of an ellipse in cross section having a major axis in a direction perpendicular to said supporting surface, and said notch is provided on said supporting surface.

31. The optical pickup device according to claim 1, wherein
said first lead frame member has a projection projecting from said first supporting member, and
said second lead frame member has a projection projecting from said second supporting member.

32. The optical pickup device according to claim 31, wherein
the projection of said first lead frame member and the projection of said second lead frame member project in the same direction.

33. The optical pickup device according to claim 31, wherein
said light source emits light from respective one ends of said first and second supporting members, and
said respective projections of said first and second lead frame members project from the other ends of said first and second supporting members.

34. The optical pickup device according to claim 33, wherein
said first lead frame member further has a heat radiating portion projecting from a side surface of said first supporting member.

35. The optical pickup device according to claim 1, wherein
said light source is mounted on said first lead frame member, and
said photodetector is mounted on said second lead frame member.

36. The optical pickup device according to claim 1, further comprising
a heat sink arranged on said first lead frame member.

37. The optical pickup device according to claim 36, wherein
said light source is a semiconductor laser device arranged on said heat sink.

38. An optical pickup device comprising:
a semiconductor laser device for emitting laser light; and
a first supporting member having a first supporting surface for supporting said semiconductor laser device,
a notch for passing the laser light emitted from said semiconductor laser device being provided at a leading end of said first supporting member extending in the direction of light emission from said semiconductor laser device,
said notch being additionally provided with a region for passing an optical axis portion of said laser light and a portion other than the optical axis portion of said laser light.

39. The optical pickup device according to claim 38, wherein said leading end of said first supporting member is parallel to the direction of light emission from said semiconductor laser device.

40. The optical pickup device according to claim 39, further comprising
a transmission type diffraction element for diffracting returned light based on the laser light emitted from said semiconductor laser device,
said leading end of said first supporting member having a diffraction element supporting surface for supporting said transmission type diffraction element.

41. The optical pickup device according to claim 39, wherein said semiconductor laser device emits laser light in the shape of an ellipse in cross section having a major axis in a direction perpendicular to said diffraction element supporting surface, and
said notch is provided on said diffraction element supporting surface.

42. An optical pickup device comprising
a semiconductor laser device for emitting laser light;
a first supporting member having a first supporting surface for supporting said semiconductor laser device;
a transmission type diffraction element for diffracting returned light based on the laser light emitted from said semiconductor laser device,
a leading end of said first supporting member being parallel to the direction of light emission from said semiconductor laser device and having a diffraction element supporting surface for supporting said transmission type diffraction element,
said semiconductor laser device emitting laser light in the shape of an ellipse in cross section having a major axis in a direction perpendicular to said diffraction element supporting surface,
a notch for passing the laser light emitted from said semiconductor laser device being provided on said diffraction element supporting surface at said leading end of said first supporting member extending in the direction of light emission from said semiconductor laser device,
a second supporting member having a second supporting surface approximately parallel to said first supporting surface and joined to said first supporting member,
a photodetector arranged on said second supporting surface of said second supporting member for receiving said returned light, and
an optical system for guiding said returned light passing through said transmission type diffraction element into said photodetector.

43. An optical recording medium driving apparatus for optically reading out information from an optical recording medium, comprising:
an optical pickup device for emitting light to said optical recording medium and receiving returned light from said optical recording medium;
a rotating mechanism for rotating said optical recording medium;
an optical pickup driving mechanism for moving said optical pickup device along the radius of said optical recording medium; and
a processor for processing a signal outputted from said optical pickup device,
said optical pickup device comprising
a first supporting member,
a second supporting member arranged on said first supporting member,
a first lead frame member provided in said first supporting member,
a second lead frame member provided in said second supporting member,
a light source provided in said first supporting member and electrically connected to said first lead frame member for emitting light, and
a photodetector provided in said second supporting member and electrically connected to said second lead frame member for detecting returned light based on the light emitted from said light source.

44. An optical recording medium driving apparatus for optically reading out information from an optical recording medium, comprising:

an optical pickup device for emitting laser light to said optical recording medium and receiving returned light from said optical recording medium;

a rotating mechanism for rotating said optical recording medium;

an optical pickup driving mechanism for moving said optical pickup device along the radius of said optical recording medium, and a processor for processing a signal outputted from said optical pickup device, said optical pickup device comprising a semiconductor laser device for emitting laser light, and a first supporting member having a first supporting surface for supporting said semiconductor laser device, a notch for passing the laser light emitted from said semiconductor laser device being provided at a leading end of said first supporting member extending in the direction of light emission from said semiconductor laser device.

* * * * *